United States Patent Office 3,825,569
Patented July 23, 1974

3,825,569
SYNTHESIS OF TRICYCLIC CARBOCYCLIC COMPOUNDS AND INTERMEDIATES THEREFOR
Zoltan George Hajos, Upper Montclair, and Eugene Paul Oliveto, Glen Ridge, N.J., assignors to Hoffmann-La Roche Inc., Nutley, N.J.
No Drawing. Application Dec. 23, 1968, Ser. No. 786,445, now Patent No. 3,644,429, which is a continuation-in-part of application Ser. No. 687,463, Dec. 4, 1967, which is a continuation-in-part of application Ser. No. 544,677, May 25, 1966, which in turn is a continuation-in-part of application Ser. No. 495,672, Oct. 13, 1965, the latter three all now abandoned. Divided and this application Sept. 13, 1971, Ser. No. 180,115
Int. Cl. C07d 13/04
U.S. Cl. 260—340.9         18 Claims

ABSTRACT OF THE DISCLOSURE

Methods for the preparation of 2,3,3a,4,5,7,8,9,9aβ,9bα-decahydro - 3aβ-primary lower alkyl-7-oxo-1H-benz[e]indenes and 4,4aβ,4bα,5,6,7,8,8a,9,10-decahydro-8aβ-primary lower alkyl - 3H-phenanthren-2-ones by cyclizing compounds of the formula

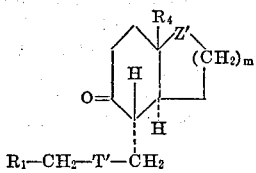

wherein $R_1$ is hydrogen or lower alkyl; $Z'$ is carbonyl or $CH(OR_2')$; $R_2'$ is hydrogen, lower alkyl, lower alkanoyl, benzoyl, nitrobenzoyl, carboxy-lower alkanoyl, carboxybenzoyl, trifluoroacetyl or camphorsulfonyl; $T'$ is $-C(X')=CH-$, $-C(OR_3)=CH-$ or $-Q'-CH_2-$; $R_3$ is lower alkyl; $X'$ is bromine, chlorine or iodine; $Q'$ is carbonyl, lower alkylene dioxy-methylene, di-(lower alkoxy)-methylene or hydroxy-methylene, $R_4$ is lower primary alkyl and $m$ is an integer having a value of 1 or 2.

The compounds of this series are useful as intermediates in the synthesis of known steroids which are pharmacologically active as fertility control agents.

RELATED APPLICATIONS

This application is a division of Ser. No. 786,445, filed Dec. 23, 1968, now U.S. Patent No. 3,644,429, issued Feb. 22, 1972, which in turn is a continuation-in-part of Ser. No. 687,463, filed Dec. 4, 1967 (now abandoned), which is a continuation-in-part of Ser. No. 544,677, filed Apr. 25, 1966 (now abandoned), which is a continuation-in-part of Ser. No. 495,672, filed Oct. 13, 1965 (now abandoned).

DETAILED DESCRIPTION OF THE INVENTION

The present invention relates to a method for the preparation of 2,3,3a,4,5,7,8,9,9a,9b - decahydro-3a-primary lower alkyl-7-oxo 1H-benz[e]indenes and 4,4aβ,4bα,5,6,7,8,8a,9,10 - decahydro-8aβ-primary lower alkyl-3H-phenanthren-2-ones containing in the 3-position and 8-position respectively, an oxo substituent or a β-$OR_2$ moiety wherein $R_2$ has the meaning given in the text accompanying formula I below. Many members of this class are known compounds which are valuable intermedaites in the synthesis of steroids. For example, benz[e]indene derivatives contain asymmetric centers at positions 9a,9b,3a and also at the 3-position if the substituent thereat is other than oxo. Thus of the 3-oxo compounds there are eight possible different stereoisomers, whereas of the compounds containing a 3 - $OR_2$ substituent there are possible sixteen stereoisomers. The synthesis of the present invention relates to the preparation of the 9aβ,9bα,3aβ-stereoisomer of the benz[e] indene series, its optical antipode, the racemate thereof, and in the case where the 3-substituent is other than oxo the 9aβ,9bα,3aβ,3β-stereoisomer, its optical antipode, and the racemate thereof. The corresponding phenanthren - 2-ones, i.e., 4aβ,4aα,8aβ stereoisomers may also be prepared. The especially desired end products of the synthesis of this invention are the (—)-enantiomers. These can be obtained by commencing the synthesis of this invention with an optically pure starting material of formula II or by commencing the synthesis of this invention with a racemic (i.e., dl)-starting material of formula II and effecting resolution at any intermediate stage or after the desired end-product of formula I has been obtained as the racemate. The desired (—)-enantiomers of the synthesis of this invention are 2,3,3a,4,5,7,8,9,9aβ,9bα-decahydro-3aβ-primary lower alkyl-7-oxo-1H-benz[e]indenes and 4,4aβ,4bα,5,6,7,8,8a,9,10 - decahydro-8aβ-primary lower alkyl-3H-phenanthren-2-ones of the formula

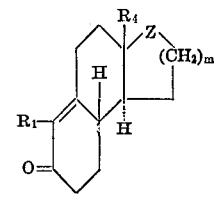

wherein at an asymmetric center a solid line to a substituent indicates that the substituent lies above the plane of the benz[e] indene nucleus and a dotted line indicates that the substituent lies below the plane of the benz[e] indene nucleus; $R_1$ is hydrogen or lower alkkyl; Z is carbonyl or $CH(OR_2)$; $R_2$ is hydrogen, lower alkyl, lower alkoxy-lower alkyl, phenyl-lower alkyl, tetrahydropyranyl, lower alkanoyl, benzoyl, nitrobenzoyl, carboxy-lower alkanoyl, carboxybenzoyl, trifluoroacetyl or camphorsulfonyl; $R_4$ is primary lower alkyl and $m$ is an integer having a value of 1 or 2.

In the first step of the synthesis of this invention, a bicyclic compound of the formula

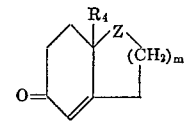

wherein Z, $R_4$ and $m$ have the same meaning as above;
is treated, in the presence of base sufficiently strong to form a conjugate anion of the bicyclic compound, with a compound of the formula $$R_1—CH_2—V \qquad III$$

wherein $R_1$ is hydrogen or lower alkyl; V is

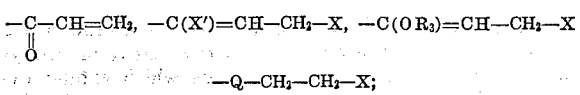

$R_3$ is lower alkyl; Q is carbonyl, lower alkylene dioxy-methylene, di-(lower alkoxy)-methylene, hydroxy-methylene, tetrahydropyranyloxy-methylene or phenyl-lower alkoxy-methylene; X is chlorine, bromine, iodine, toxyloxy or mesyloxy; and $X'$ is chlorine, bromine or iodine.

Thus, in one aspect, this invention comprises a method for the preparation of a compound of the formula

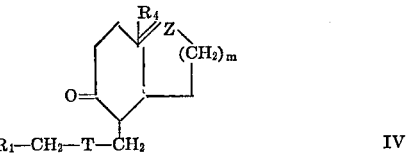

IV wherein $R_2$, $R_4$, $m$ and $Z$ have the same meaning as above; T is —C(X')=CH—, —C(OR_3)=CH— or —Q—CH_2—8 and
$R_3$, X' and Q have the same meaning as above, which comprises treating a bicyclic compound of formula II with a compound of formula III in the presence of base sufficiently strong to form a conjugate anion of the bicyclic compound.

In another aspect, this invention comprehends the compounds of formula IV, which are novel compounds, and are useful as chemical intermediates as described herein. Also, certain of the reactants of formula III are novel compounds and these two are comprehended by the present invention. Throughout this specification, in all the formulas of compounds containing asymetric centers or in the designation of such compounds by chemical nomenclature, the desired enantiomeric form is shown or designated. However, unless explicitly indicated otherwise, such illustration and designation should be taken as comprehending the enantiomer shown or designated, as well as its optical antipode, and their corresponding racemate.

As used herein the term lower alkyl comprehends both straight and branched chain, saturated hydrocarbon moieties such as methyl, ethyl, isopropyl, n-propyl, t-butyl and the like. The term primary lower alkyl denotes an alkyl group having its valence bond from a carbon bonded to at least two hydrogens containing from 1 to 5 carbons. Halogen denotes all the halogens, e.g., chlorine, fluorine, bromine and iodine. The formative "lower alk" when used in expressions such as lower alkoxy, lower alkanoyl and lower alkylene has the same significance. Thus, exemplary of the expression lower alkoxy-lower alkyl is α-ethoxy-ethyl. Exemplary of lower alkanoyl are acetyl and propionyl, and exemplary of lower alkylene-dioxy is ethylenedioxy. The term nitrobenzoyl as used herein comprehends benzoyl moieties containing one or more aromatic nitro substituents, for example, nitrobenzoyl moieties such as 4-nitrobenzyl and dinitrobenzoyl moieties such as 3,4-dinitrobenzoyl. The expression carboxy-lower alkanoyl comprehends dibasic aliphatic acids absent one OH moiety. Similarly, the expression carboxy-benzoyl denotes, for example, phthalic acid absent one OH moiety. The meanings for Q given in the text accompanying formula III above can be represented by the following partial formula

V wherein $k'$ and $k''$ taken together are oxo or lower alkylene-dioxy, and, individually, $k'$ is lower alkoxy (in which case $k'$ is lower alkoxy), hydroxy, tetrahydropyranyloxy or phenyl-lower alkoxy (in which cases $k''$ is hydrogen).

Especially preferred compounds of this invention are those derivatives wherein $R_4$ is methyl, ethyl or propyl which can be converted into steroids which exhibit exceptionally active pharmacological properties as hereinafter described.

Preferred agents of formula III are 1-bromo-3-penetanone cyclic lower alkylene ketals, such as 2-(2-bromoethyl)-2-ethyl-1, 3-dioxolane; 2-(bromo-, chloro- or iodoethyl)-2-ethyl-dioxolane; 1,3-dichloro-2-butene; and lower alkyl vinyl ketones, such as ethyl vinyl ketone. Especially preferred is 2-(2-bromoethyl)-2-ethyl-1,3-dioxolane which is a novel compound and can be made by various routes, for example, 1-bromo-3-pentanone can be directly trans-ketalized. The compound 1-bromo-3-pentanone can be prepared by various routes; for example, by treatment of ethyl vinyl ketone with hydrogen bromide a a temperature below room temperature, for example, at about —10° C., or by treatment of propionyl bromide with ethane in the presence of aluminum tribromide. An alternative method for preparing 2-(2-bromoethyl)-2-ethyl-1,3-dioxolane is to form the cyclic ethylene ketal of a lower alkyl ester or hydroxy-lower alkyl of α-propionyl-acetic acid and to reduce the so-formed ester of 2-(2-carboxyethyl-2-ethyl - 1,3 - dioxolane whereby 2-(2-hydroxyethyl)-2-ethyl-1,3-dioxolane is obtained. This latter compound upon treatment with phosphorous tribromide yields 2(2-bromoethyl)-2-ethyl-1,3-dioxane.

As indicated above the treatment of a bicyclic compound of formula II with a compound of formula III to form a compound of formula IV is conducted in the presence of a base sufficiently strong to form a conjugate anion of the bicyclic compound. Any base which is sufficiently strong to form the conjugate anion can be used for this purpose. Exemplary bases are for example alkali metal alkoxides such as sodium methoxide, sodium ethoxide, potassium methoxide, potassium t-butoxide and the like; alkali metal hydroxides such as sodium hydroxide, potassium hydroxide, lithium hydroxide and the like; alkali metal hydrides such as sodium hydride, lithium hydride and the like; alkali metal amides such as lithium amide, sodium amide and the like; methyl sulfinyl carbanion (i.e., the anion from dimethyl sulfoxide) and quaternary ammonium hydroxides or alkoxides of the formula

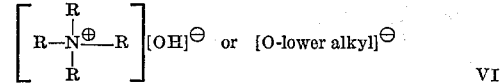

VI wherein each R is a hydrocarbon such as lower alkyl or phenyl-lower alkyl and at least one R is phenyl-lower alkyl.

Especially preferred quaternary ammonium agents of formula VI are benzyl tri-lower alkyl ammonium hydroxides such as benzyl trimethyl ammonium hydroxide.

The treatment of a compound of formula II with a compound of formula III in the presence o a base sufficiently strong to form the desired conjugate anion can be conducted at room temperature or at below or above room temperature. It is preferred to conduct the reaction at a temperature between about 5° C. and about 100° C. and it is especially advantageous to conduct the reaction at a temperature between about 15° C. and about 25° C. Moreover, the reaction is suitably conducted in the absence of oxygen, for example, in an atmosphere of an inert gas such as nitrogen or argon. It is also advantageous to conduct the reaction under anhydrous conditions. Moreover, it is suitable to conduct the reaction in the presence of an organic solvent inert to the reactants as well as the desired end product of formula IV. Such solvents are, for example, dimethylformamide, dimethyl sulfoxide, aromatic hydrocarbons such as benzene, toluene, xylene, cumene and the like; ethers such as diethyl ether, tetrahydrofuran and the like; and lower alkanols such as methanol, ethanol and the like. The concentration of reactants is not critical, but it is preferred to use at least one molar equivalent of the reactant of formula III. It is especially advantageous to use about one molar equivalent of the reactant of formula III. It is preferable to add the reactant of formula III to a reaction mixture already containing the conjugate anion of the reactant of formula II; however, the reaction can also be effected by placing all the reactants, i.e., the compound of formula II and the compound of formula III and the base, together substantially concurrently, or, in the alternative, the reactant of formula II can be added to a mixture containing the reactant of formula III.

The next aspect of this invention comprises a method for the preparation of a compound of the formula

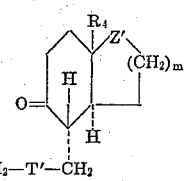

VII wherein $R_1$ is hydrogen or lower alkyl; $Z'$ is carbonyl or or $CH(OR_2')$; $R_2'$ is hydrogen, lower alkyl, lower alkanoyl, benzoyl, nitrobenzoyl, carboxy-lower alkanoyl, carboxybenzoyl, trifluoroacetyl or camphorsulfonyl; $T'$ is $-C(X')=CH-$, $-C(OR_3)=CH-$ or $$-Q'-CH_2-;$$

$R_3$ is lower alkyl; $X'$ is bromine, chlorine or iodine; $Q'$ is carbonyl, lower alkylylene dioxy-methylene, di-(lower alkoxy)-methylene or hydroxy-methylene, $R_4$ is lower primary alkyl and $m$ is an integer having a value of 1 or 2 which comprises the hydrogenation of a compound of formula IV. By this hydrogenation the 3a,4-unsaturation of the 5-oxoindane-4-yl moiety of the compound of formula IV is reduced yielding as the hydrogenation product a mixture containing as the main components the $3a\alpha,4\alpha$ (illustrated in formula VIII below) and $3a\beta,4\beta$ stereoisomeric hydrogenation products of the compound of formula IV. Compounds having the desired $3a\alpha,4\beta$-configuration of the hydrogens in compounds of formula VII can then be obtained by equilibration of the $3a\alpha,4\alpha$-hydrogenation product of formula VIII. In order to effect the desired equilibration it is unnecessary to separate the stereoisomeric mixture. The equilibration treatment can be effected by means known per se, for example, by treatment of the $3a\alpha,4\alpha$-hydrogenation product with either an acid or a base. Thus, there can be used basic materials, such as, alkali metal alkoxides, for example, sodium methoxide, alkali metal hydroxides, for example, calcium hydroxide, barium hydroxide, strontium hydroxide, or acidic materials such as lower alkanoic acid, for example, acetic acid, propionic acid, or mineral acids, for example, dilute hydrobromic acid or dilute hydrochloric acid. The equilibration can also be effected by chromatographing the hydrogenation product using a column with basis or acidic properties, for example, an aluminum oxide column.

Inasmuch as the ultimate goal of this invention is to produce a benz[e]indene containing $9b\alpha$ configuration and phenanthren-2-ones containing a $4b\alpha$ configuration, it is clear that the hydrogenation of a compound of formula IV should be conducted so as to predominantly proceed so as to yield a trans-hydrogenation product with respect to the two rings of the 5-oxoindanyl moiety or the corresponding 2-naphthalenone moiety. A feature of this invention is that this desired hydrogenation to yield a trans-fused-bicyclic structure can be suitably effected in high yield by hydrogenation in the presence of a catalyst, preferably a noble metal catalyst such as palladium, rhodium, iridium, platinum or the like. Especially preferred is a palladium catalyst. The noble metal catalyst can be utilized with or without a carrier, and if a carrier is used, conventional carriers are suitable. It is preferred to use palladium on a barium sulfate carrier; especially preferred is 10% $Pd/BaSO_4$. The ratio of catalyst to substrate is not critical and can be varied; however, it has been found advantageous to utilize a weight ratio of catalyst to substrate from about 1:1 to about 1:6. Especially preferred is a ratio of about 1:3. The hydrogenation is suitably effected in the presence of an inert organic solvent for the compound of formula IV being hydrogenated, or example, an alkanol, for example, a lower alkanol such as methanol, isopropanol, or octanol; ketones, for example, lower alkyl ketones such as acetone or methyl ethyl ketone; esters of carboxylic acids, for example, lower alkyl esters or lower alkanoic acids such as ethyl acetate; ethers, for example, lower alkyl ethers such as diethyl ether, or tetrahydrofuran; aromatic hydrocarbons such as toluene or benzene; and the like. It is especially preferred to conduct the hydrogenation utilizing an alkanol as the solvent and it is preferably conducted under nonacidic conditions. Suitably, the hydrogenation is conducted under neutral conditions. It can be conducted at atmospheric pressure or below or above atmospheric pressure, for example, at pressures as high as about 50 atmospheres. Also the hydrogenation can be conducted at room temperature or temperature above or below room temperature. As a matter of convenience it is preferred to conduct the hydrogenation at room temperature. It is preferred to conduct the hydrogenation utilizing conventional techniques, for example, the hydrogenation should be stopped after uptake of an equivalent of hydrogen or if the absorption of hydrogen ceases beore the uptake of an equivalent of hydrogen, it is advantageous to then add more catalyst and further hydrogenate. Depending on the hydrogenation conditions utilized, the groups represented by Z and T in formula IV can be modified during the hydrogenation. For example, under above-described hydrogenation conditions when Z is $OR_2$ and $R_2$ is a group such as lower alkoxy-lower alkyl or tetrahydropyranyl, such group can be split off during the hydrogenation procedure. Also, when T in formula IV is $-Q-CH_2-$ and Q is phenyl-lower alkoxy, or tetrahydropyranyloxy such groups can be split off during the hydrogenation procedure yielding products of formula VIII wherein $T'$ is $-Q'-CH_2-$ and $Q'$ is hydroxy-methylene.

From the above it will be appreciated that a significant aspect of this invention is a method for the preparation of a compound of the formula

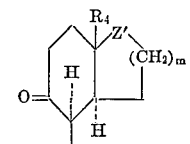

VIII wherein $R_1$, $T'$, $R_4$, $m$ and $Z'$ have the same meaning as above.

which comprises the hydrogenation of a compound of formula IV in the presence of a noble metal catalyst.

Following the hydrogenation and either simultaneously with or following equilibration the compound of formula VII is cyclized to the desired compound of formula I. Thus, a separate aspect of this invention is a method for the preparation of a compound of formula I which comprises cyclization of a compound of formula VII. The cyclization is suitably effected via treatment of a compound of formula VII with either an acidic or a base reagent. The cyclization reagent can be of the same type as the equilibration reagent and thus the equilibration and cyclization need not be separate steps but can be effected simultaneously, in which case a compound of formula VIII is directly treated with the equilibration/cyclization reagent. Thus, a separate equilibration step is not essential, but it has been found to be preferred as it results in increased overall yields. The question of which cyclization reagents are preferred can be determined by the nature of the compound being cyclized, i.e., by the nature of the moiety in formula VII represented by the symbol $T'$. Thus, if there is being cyclized a compound of formula VII wherein the symbol $T'$ embodies a ketal group then it is preferable to cyclize by means of an acidic reagent whereby deketalization and ring closure are simultaneously effected. On the other hand deketalization can be effected by an acidic reagent milder than that required for cyclization. Thus, deketalization can be selectively effected by utilizing an acidic reagent sufficiently acidic to deketalize but milder than that required for cyclization. After such a selective deketalization, ring closure can then, if desired, be effected on the basic side as well as on the acidic side. In those cases wherein the compound of formula VII contains in the side chain an enol ether or enol halide, i.e., has as a side chain at the 4-position of the 5-oxo-indanyl moiety a but-2-en-1-yl moiety containing in the 3-position a chloro, bromo or iodo or $OR_3$ substituent, the cyclization is suitably effected on the acid side since acidic cyclization conditions will also effect hydrolysis of the substituent in the 3-position of the butenyl moiety giving the corresponding enolic intermediate which undergoes the cyclization. This simultaneous cyclization-ring closure is suitably effected via the utilization of a mineral acid, such as sulfuric acid, hydrochloric acid, hydrobromic acid, phosphoric acid or the like. In those cases wherein the compound of formula VII contains a 3-oxo-alkyl side chain the cyclization can be effected under either acidic or basic conditions. In those cases wherein the side chain contains a hydroxy group, i.e., wherein Q' is hydroxy-methylene, then an oxidation step should precede the cyclization. By this oxidation the hydroxy moiety in the 3-position of the side chain is oxidized to an oxo moiety, for example, a 3-hydroxybutyl side chain can be converted to a 3-oxobutyl side chain. This oxidation can be effected by means known per se, for example, by oxidation which chromic acid.

The cyclization reagents as indicated above can be the same reagents as are used for the preceding equilibration. Exemplary cyclization reagents are mineral acids, for example, sulfuric acid, phosphoric acid, hydrobromic acid, hydrochloric acid, and the like. Exemplary basic cyclization reagents are, for example, alkali metal hydroxides and alkali metal alkoxides such as alkali metal lower akoxides. If the cyization is conducted on the acidic side, it can be conducted at room temperature or below or above room temperature. It is preferable to conduct the acidic cyclization at an elevated temperature between about room temperature and the reflux temperature of the reaction mixture. If the cyclization is conducted on the basic side it can also be conducted at room temperature or at below or above room temperature, but as a matter of convenience it is preferable to conduct it at about room temperature.

As indicated above, the 2,3,3a,4,5,7,8,9,9aβ,9bα,decahydro3aβ-alkyl-7-oxo-1H-benz[e]indenes and the 4,4aβ,4bα,5,6,7,8,8a,9,10 - decahydro - 8aβ - alkyl - 3H - phenanthren-2-ones of Formula I obtained by the processes of this invention are a known class of compounds which are useful as intermediates in the preparation of pharmaceutically valuable steroid-end-products. These tricyclic compounds can be converted into the tetracyclic steroid nucleus for example, by reaction with methyl-vinyl-ketone or 1,3-(2)-dichlorobutene according to methods known per se. The patent literature contains many references which are illustrative of these methods and others in order to effect conversion of the tricyclics represented by Formula I to known steroids of which U.S. Pat. Nos. 3,115,507; 3,120,544; 3,128,591; 3,150,152; 3,168,530 and Belgian Pat. 663,193 are exemplary.

The utility of tricyclic intermediates represented by Formula I is schematically set forth in the reaction scheme below. The ultimate utility of the tricyclic intermediates depends on the nature of the variables $R_1$ and $R_4$. For example, compounds wherein $R_1$ is hydrogen may lead to either normal-steroids via $\Delta^{9(11)}$, 10β precursors of 19-nor-steroids (cf. Velluz et al., Angewandte Chemie 72, 725, 1960); or alternatively to 10α-19-nor-steroids (cf. French Pat. 1,360,550) depending upon the reaction conditions. Further the tricyclics wherein $R_1$ is hydrogen may be converted into 19-nor-retro(9β,10α)-steroids (cf. Velluz et al., Tertahydron Suppl. 8, Part II, 495, 1966) and estrogens viz-compounds having an aromatic "A" ring— e.g., estradiol (cf. Volluz et al., Angewandte Chemie 72, 725, 1960). On the other hand, compounds wherein $R_1$ is lower alkyl may lead to compounds of the 9α,10α-series (cf. Velluz et al., Engewandte Chemie 77, 185, 1960) or alternatively to compounds of the retrosteroid series viz— those having inverted centers of asymmetry at positions $C_9$ and $C_{10}$, i.e., the 9β, 10α-steroids (cf. Belgian Pat. 663,193). A more specific description of the above follows.

Thus, the retrosteroids represented by Formula XVIII can be prepared in accordance with steps (a) and (b) of the reaction scheme set forth below. The cyclo-olefin represented by Formula I wherein $R_1$ is hydrogen or lower alkyl (Step a) can be hydrogenated to the tricyclic compounds represented by Formula XV by known means. The reaction is preferably effected with a noble metal catalyst, e.g., a palladium, rhodium or the like at room temperature in a suitable organic solvent, preferably a lower alkanol such as ethanol. The catalyst carrier can be any conventional carrier exemplary of which are carbon and barium sulfate. The conversion of the tricyclic compounds represented by Formula XV to the retrosteroids represented by the Formula XVIII (Step b) is described in Belgian Pat. No. 663,197.

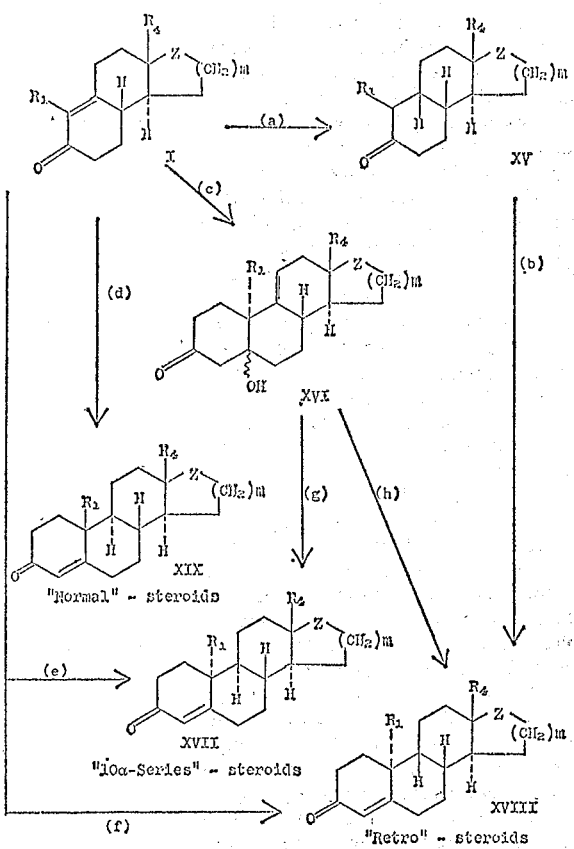

The steroids represented by Formulas XVII and XIX are prepared from the tricyclic compounds represented by Formula I for values wherein $R_1$ is hydrogen by means known in the art. Specifically, the compounds represented by Formula XVIII viz-steroids of the 19-nor-10α series and compounds represented by Formula XIX viz—normal steroids of the 9α,10β or 9α-19-nor series can be prepared in accordance with steps (e) and (d) respectively; as described in Angewandte Chemie 77, 185 (1965), Velluz, Valls and Nominé and Angewandte Chemie 72, 725 (1960), Velluz et al.

An alternative and preferred procedure in accordance with step (d) of the Reaction Scheme for converting the tricyclic compounds represented by Formula I, wherein $R_1$ is hydrogen, to normal steroids of the 9α-19-nor series represented by Formula XIX employs the novel reactant, 4-halo-2-tertiarybutoxy-butane wherein the halogen may be fluorine, chlorine, bromine or iodine. In a specific embodiment, 2,3,3a,4,5,7,8,9aβ,9bα-decahydro-3aβ - ethyl-3-oxo-7-oxo-1H-benz[e]indene may be reacted with 4-chloro-2-tertiarybutoxy-butane. The reaction is conducted in a suitable solvent such as, for example, dimethylformamide; a hydrocarbon such as benzene, xylene and the like; or dimethylsulfoxide, preferably under a nitrogen atmosphere, in the presence of a base such as an alkali hydride, e.g., sodium hydride or an alkali alkoxide, e.g., potassium tertiarybutoxide at a temperature range of between 15° and 100° to yield the intermediate 10-[3-tertiarybutoxy-butyl]-13-methyl - 19 - nor-des-A-androst-9-ene-5,17-dione. This latter compound can be converted to norgestrel by procedures described in the experimental section herein and also described more fully in the patent application of Saucy, Ser. No. 679,989, filed on Nov. 2, 1967 now U.S. Pat. No. 3,544,598, issued Dec. 1, 1970.

4-Halo-2-tertiarybutoxy-butane may be prepared from 4-halo-2-butanol by reaction of the latter compound with isobutylene in the presence of a strong mineral acid such as sulfuric acid or a hydrogen halide acid, preferably, hydrochloric acid at room temperature by known means.

In accordance with step (f) of the Reaction Scheme, the tricyclic compounds represented by Formula I, for values wherein $R_1$ is lower alkyl can be converted by methods known in the art to compounds represented by Formula XVIII viz—steroids of the "retro" series by base catalyzed reaction with methyl vinyl ketone.

In accordance with steps (c) and (h) of the Reaction Scheme, compounds represented by Formula I can be reacted with methyl-vinyl-ketone yielding the 5-hydroxy-tetracyclic compound represented by Formula XVI (step c). These latter compounds can then be subjected to dehydration followed by hydrogenation or to hydrogenation followed by dehydration to yield 9β, 10α- or 10α-steroids represented by Formulas XVIII and XVII respectively. These procedures are described in detail in Netherlands Octrooiaanvrage No. 6,412,939.

Still other methods of utilizing compounds represented by Formula I are described in the literature and the patents.

Compounds represented by Formula XIX wherein $R_4$ is ethyl, Z is carbonyl, $m$ is 1 and $R_1$ is hydrogen can be selectively alkynylated by a suitable organo metallic acetylide to afford norgestrel (13β-ethyl - 17α - ethinyl-17-hydroxy-gon-4-ene-3-one). Exemplary of the suitable alkynylating agents to effect the conversion to norgestrel are the alkali acetylides such as lithium acetylide, potassium acetylide, sodium acetylide and the like. The reaction is carried out in the presence of liquid ammonia in a suitable solvent such as a hydrocarbon, e.g., benzene or toluene. The alkynylation is effected preferably at the reflux temperature of the reaction medium although temperatures from —60° to —30° are suitable. Exemplary of other suitable methods which may be employed to effect the C–17 acetylenic addition is reaction with a lithium acetylide-ethylaminediamine complex in a dimethylformamide solvent by means known to the art.

Further, the 19-nor-compounds represented by Formula XIX wherein $R_4$ is propyl are pharmacologically active ovulatory inhibitors. (Cf. Tetrahedron Letters 127 (1961), Velluz, Nominé et al.) 19-Nortestosterone acetate, encompassed by the series of thhe compounds represented by Formula XIX is a known androgenic agent (cf. J. Org. Chem., 26, 3904 (1961), L. J. Chinn and H. L. Dryden).

Moreover, compounds of Formula XVIII wherein $R_4$ is ethyl and $R_1$ is methyl, i.e., 18-homo-retrosteroids, specifically the acetyl derivatives in the pregnane series, are progestational agents and are thus useful in the treatment of fertility disorders. The 18-homo-retroandrostanes of this series have both anti-estrogenic and anti-androgenic activity and also effect the secretion of gonadotropic hormones. Hence, these compounds can be used for example, in the treatment of gynecological disorders or as contraceptive agents. The progestational activity of the 18-homo-retrosteroids of the series represented by Formula XVIII was determined by a standard pharmacological test procedures, i.e., the Clauberg assay. Briefly, this method consists of administering the compounds for five consecutive days to estrogen-primed, immature, female rabbits. At autopsy, the uterus is removed, and a histological preparation is made of the uterine cross section. The histological section is evaluated microscopically. Progestational activity if present is evidenced by a secretary-type endometrial response.

The progestationally active 18-homo compounds represented by Formula XVIII can be used in the form of conventional pharmaceutical preparations which contain said compounds in admixture with conventional pharmaceutical organic or inorganic inert carrier materials suitable for internal administration. The pharmaceutical compositions can contain such conventional organic or inorganic inert carrier materials, such as, water, gelatin, lactose, starch, magnesium stearate, talc, vegetable oils, gum, polyalkylene glycols or the like. These pharmaceutically useful compounds can be administered internally, for example, orally or parenterally in solid or liquid forms such as tablets, capsules, solutions, suspensions or the like.

The methods of this invention, as indicated above, result in the preparation either of the desired optical antipode illustrated by formula I or in the racemate thereof. The optical antipode illustrated by formula I can be obtained either by resolution of the corresponding racemate or by resolution of racemic starting material or, if racemic starting material is directly subjected to the methods of this invention, resolution of any intermediate racemate. Resolution can be effected by conventional resolution means known per se. For example, compounds in which the moiety represented by the symbol Z is hydroxy-methylene, or a group convertible into hydroxy-methylene such as carbonyl (convertible by reduction to hydroxy-methylene) or an ether or ester of hydroxy-methylene (convertible by hydrolysis to hydroxy-methylene), can be resolved by reacting the compound containing the hydroxy-methylene moiety with a dibasic acid to form a half-acid ester. If the dibasic acids are, for example, dibasic-lower alkanoic acids such as oxalic acid, malonic acid, succinic acid, glutaric acid, adipic acid or the like, or an aromatic dibasic acid such as phthalic acid, the so-formed half-acid ester is then reacted to form a salt with an optically active base as brucine, ephedrine or quinine and the resulting diastereoisomeric products are separated. Alternatively the hydroxy-methylene moiety can be esterified with an optically active acid such as camphorsulfonic acid and the resulting diastereoisomeric esters can be separated. The optical antipodes can be regenerated from the separated diastereoisomeric salts and esters by conventional means.

The following examples are illustrative but not limitative of the invention. All temperatures are stated in degrees Centigrade. Infrared, ultraviolet and nuclear magnetic resonance spectra where taken were consistent with stated structures.

Example 1

Methylene chloride (200 ml.) was added with stirring and cooling to 133.5 g. anhydrous $AlBr_3$. Hydroquinone monomethyl ether (0.1 g.) was then added, and the suspension cooled to —10°. Propionyl bromide (63.5 g., ca. 41.8 ml.) was then added within a 10 minute period while stirring at —10°. Most of the material went into solution.

Ethylene gas was bubbled into the reaction mixture through a dry $CaCl_2$ tower at a rapid rate so that the temperature would not exceed 0°. After 1.5 hr., the solution was not absorbing any more gas. It was then stirred without further addition of ethylene for 30 min., and then transferred into a dropping funnel.

The so-formed solution was then added dropwise while stirring to an ice cold solution of 125 ml. conc. HCl and 475 ml. ice water.

The methylene chloride layer was separated and the aqueous layer was twice extracted with methylene chloride. The combined extracts were washed with saturated $NaHCO_3$, with water, finally with a saturated NaCl solution, and then dried with $Na_2SO_4$. The so-obtained 1-bromo-3-pentanone in methylene chloride solution was used without further isolation.

The cyclic ethylene ketal of methyl ethyl ketone (235 g.), 750 mg. p-toluenesulfonic acid monohydrate and 220 ml. benzene were added to the above-prepared methylene chloride solution containing 1-bromo-3-pentanone. The reaction mixture was stirred and refluxed under nitrogen. The methylene chloride was slowly distilled off through a packed (Fenske) column. As the distillation proceeded, benzene was added through a dropping funnel to the distilling flask to maintain the volume unchanged. After 6 hr., approximately 400 ml. of solvent was collected. The solution was then refluxed for 16 hr. without further removal of solvent.

The reaction solution was then cooled with an ice bath, stirred, and a saturated $NaHCO_3$ solution added to neutralize the acid. The water layer was separated, the benzene layer dried with $Na_2SO_4$, and evaporated in vacuo. The residual oil was distilled in high vacuo yielding 2-(2-bromoethyl)-2 - ethyl - 1,3 - dioxolane; b.p. 41–45° (0.4 mm.); $n_D^{24}$ 1.4690.

Example 2

Sodium hydride in mineral oil (1.26 g. contg. 57% hydride) was suspended in anhydrous ether under a nitrogen atmosphere. The ether and the mineral oil were removed with a pipette, and the sodium hydride was dispersed in 60 ml. anhydrous dimethylformamide. To this suspension there was immediately added at 15°, while stirring under a nitrogen atmosphere, 5.0 g. of dl-7,7a-dihydro - 1β - hydroxy-7aβ-methyl-5(6H)-indanone dissolved in 60 ml. of anhydrous dimethylformamide. After stirring the reaction mixture at 15° for 90 minutes, 6.65 g. of 2-(2-bromoethyl)-2-ethyl-1,3-dioxolane dissolved in 25 ml. of anhydrous dimethylformamide was added at once. The resultant solution was then stirred at 20° for 16 hr. under a nitrogen atmosphere. It was then evaporated to dryness in vacuo. The residue was taken up in benzene, and evaporated in vacuo, and this treatment was repeated several times to remove the dimethylformamide. The residue was then taken up in ether, and filtered through a filter aid ("Celite") to remove the inorganic salts. The ether solution was then washed two times with 10 ml. 0.5N $NaHCO_3$ solution and once with 10 ml. saturated NaCl solution. It was dried with $MgSO_4$, and evaporated in vacuo yielding dl-1-(5,6,7,7a-tetrahydro-1β-hydroxy-7aβ-methyl - 5 - oxoindane-4-yl)-3-pentanone cyclic ethylene ketal as an oil. This oil was used without further purification in the procedure described in Example 3.

Another sample of the so-obtained oil, i.e., crude dl-1-(5,6,7,7a-tetrahydro - 1β - hydroxy-7aβ-methyl - 5 - oxoindane-4-yl)-3-pentanone cyclic ethylene ketal, was chromatographed using Woelm neutral aluminum oxide of activity III, and gave dl-1-(5,6,7,7a-tetrahydro - 1β - hydroxy-7aβ-methyl - 5 - oxoindane-4-yl)-3-pentanone cyclic ethylene ketal in purified form. Refractive index, $n_D^{20}$ 1.5230.

Example 3

Crude dl-1-(1,6,7,7a-tetrahydro-1β-hydroxy - 7aβ-methyl-5-oxoindane-4-yl)-3-pentanone cyclic ethylene ketal (7.15 g.) was dissolved in 210 ml. of absolute ethanol, 2.36 g. of 10% Pd on $BaSO_4$ catalyst was added, and the reaction mixture was hydrogenated at 3 atm. and 20° in a Parr shaking hydrogenation apparatus. After 1 hr. of hydrogenation time U.V. spectroscopy indicated ca. 10% α,β-unsaturated ketone, therefor another 2.36 g. of 10% Pd on $BaSO_4$ was added, and after an additional 40 minutes of hydrogenation there was practically no α,β-unsaturated ketone in the reaction mixture which contained a mixture of dl-1-(3aα,4α,5,6,7,7a-hexahydro-1β-hydroxy-7aβ-methyl-5-oxoindane-4-yl)-3-pentanone cyclic ethylene ketal and dl-1-(3aβ,4β,5,6,7,7a - hexahydro-1β-hydroxy-7aβ-methyl-5-oxoindane-4-yl)-3-pentanone cyclic ethylene ketal. The solution was then filtered through a pad of filter aid ("Celite"), and evaporated in vacuo. The residual oil was dissolved in 81 ml. methanol, 8.9 ml. of 1N sodium methoxide in methanol was added, and the mixture was stirred under a nitrogen atmosphere at 20° for 15 min. yielding a solution containing dl-1-(3aβ,4β,5,6,7,-7a-hexahydro-1β-hydroxy-7aβ-methyl-5-oxoindane - 4-yl)-3-pentanone cyclic ethylene ketal and dl-1-(3aα,4β,5,6,7,-7a-hexahydro-1β-hydroxy - 7aβ - methyl-5-oxoindane-4-yl)-3-pentanone cyclic ethylene ketal. A solution of 87 ml. 2N hydrochloric acid and 153 ml. of distilled water was then added at once. The mixture was stirred and refluxed under a nitrogen atmosphere for 5 hr., and then kept at 20° for 12 hr. It was collected to 5°, and neutralized with approx. 8.3 ml. of a 50% sodium hydroxide solution, and then extracted with acetate, washed twice with 0.5N sodium bicarbonate solution and then with saturated sodium chloride solution. The ethyl acetate solution was dried with sodium sulfate, filtered, and evaporated in vacuo to give an oil which was dissolved in 150 ml. ether. The solution was then stirred for 15 min. with 50 ml. of a freshly prepared saturated sodium bisulfite solution. The ether layer was separated, and this treatment was repeated two more times under identical conditions. The ether layer was separated, washed three times with a saturated sodium chloride solution, dried with magnesium sulfate, filtered, and evaporated in vacuo to give an oil which solidified on standing to an amorphous solid, which was chromatographed on a synthetic magnesia-silica gel (Florisil) (100/200 mesh) column with benzene to give a crystalline material which upon crystallization from ether yielded dl-2,3,3a,4,5,7,8,9,9aβ,9bα - decahydro - 3aβ,6-dimethyl-3β-hydroxy-7-oxo-1H-benz[e]-indene, m.p. 132.5–135.5°.

The mother liquor of the first crystalline crop was concentrated to approximately 3 ml. of volume, and on standing it deposited further dl-2,3,3a,4,5,7,8,9,9a,β,9bα-decahydro-3aβ,6-dimethyl-3β-hydroxy - 7 - oxo-1H-benz[e]indene, m.p. 128–132°.

Example 4

Dl-2,3,3a,4,5,7,8,9,9aβ,9bα-Decahydro - 3aβ,6 - dimethyl-3β-hydroxy-7-oxo-1H - benz[e]indene (117 mg.) was dissolved in 21 ml. acetone (distilled from $KMnO_4$). The solution was cooled to −12° stirred, and 0.14 ml. of 8.0 N $CrO_3$—$H_2SO_4$ was added under a nitrogen atmosphere. After approx. 15 min., 10 ml. saturated NaCl solution was added, and the cold mixture was extracted two times with ethyl acetate and then once with ether. The extract was washed with 1N sodium bicarbonate solution and with a saturated NaCl solution, dried over sodium sulfate, filtered and evaporated to dryness in vacuo giving an oil, which crystallized on scratching. Recrystallization from ether-petroleum ether (b.p. 30–60°) followed by a recrystallization from ether gave dl-2,3,3a,4,5,7,8,9,9aβ,9bα-decahydro-3aβ,6-dimethyl - 3,7-dioxo-1H-benz[e]indene, m.p. 98.5–100°.

Example 5

90 mg. of a sodium hydride in mineral oil dispersion was washed free of oil with anhydrous ether (distilled from $CaH_2$). Dimethyl sulfoxide (4.0 ml., freshly distilled from $CaH_2$) was added, and the resulting suspension was stirred and heated to 65–70° under a nitrogen atmosphere for 1 hr. giving a fairly clear, pale grey solution of the methylsulfinyl carbanion.

The solution was then cooled to 20°, and 500 mg. of 7,7a-dihydro-1β-hydroxy - 7a - methyl-5(6H)-indanone-tetrahydropyranyl ether dissolved in 4.0 ml. of dimethylsulfoxide was added at once, while the temperature was maintained at 20°, if necessary, using an external cooling bath. The solution immediately turned dark brown. It was stirred under a nitrogen atmosphere for 2 hr. at 20°.

2-(2-Bromoethyl)-2-ethyl - 1,3 - dioxolane (480 mg. =approx. 0.36 ml.) dissolved in 2.0 ml. of anhydrous dimethylsulfoxide was added at once, and the reaction mixture was then stirred under a nitrogen atmosphere at 20° for 16 hr. The dimethylsulfoxide was distilled off in high vacuo under a nitrogen atmosphere, and the residue was dispersed in ether. The inorganic salt was filtered off, and the filtrate was washed twice with a small amount of saturated NaCl solution. The ether solution was dried with Na₂SO₄ treated with charcoal (Norit A, cf. Merck Index, 7th Ed.; p. 1587), filtered, and evaporated in vacuo. The so-obtained oily residue was treated two times with toluene and several times with ether, the solvent being evaporated after each treatment. The so-obtained crude reaction product was chromatographed on Woelm neutral aluminum oxide of activity III yielding dl-1-(5,6,7,7a-tetrahydro-1β-tetrahydropyranyloxy-7aβ-methyl - 5 - oxoindan-4-yl)-pentanone cyclic ethylene ketal. The compound is an oil.

Example 5A

Crude reaction product prepared by the procedure of Example 5 (6.54 g.) in 165 ml. of absolute ethyl alcohol was hydrogenated at 23° and atmospheric pressure in the presence of 1.96 g. of 10% Pd on BaSO₄ catalyst. The hydrogenation took one hour. The tetrahydropyranyl protecting group was partially split off during hydrogenation and crude hydrogenation product containing dl-1-(3aα,4α,5,6,7,7a - hexahydro - 1β - hydroxy-7aβ-methyl-5-oxoindane-4-yl)-3-pentanone cyclic ethylene ketal was obtained. A portion (605 mg.) of this crude product was dissolved in 0.1N sodium methoxide in methanol. The resulting solution was stirred under a nitrogen atmosphere at 20° for 15 minutes yielding, in solution, dl-1 - (3aα,4β,5,6,7,7a-hexahydro-1β-hydroxy-7aβ-methyl - 5 - oxoindane-4-yl)-3-pentanone cyclic ethylene ketal. This solution was then refluxed with aqueous 1N HCl under a nitrogen atmosphere for 5 hours, yielding crude dl-2,3,3a,4,5,7,8,9,9aβ,9bα-decahydro-3aβ,6-dimethyl - 3β - hydroxy-7-oxo-1H-benz[e]indene.

Example 6

A 57% sodium hydride in mineral oil dispersion (45.5 mg.) was suspended in anhydrous ether under a nitrogen atmosphere. The ether and mineral oil were removed with a pipette and the sodium hydride suspended in 5 ml. of anhydrous dimethylformamide. The suspension was cooled to 0° and, in one portion, a solution of 166 mg. of dl-7,7a-dihydro-1β-hydroxy - 7aβ - methyl-5(6H)-indanone and 240 mg. of 2-(2 - bromoethyl) - 2 - ethyl-1,3-dioxolane dissolved in 5 ml. of anhydrous dimethylformamide was added to the cooled suspension under a nitrogen atmosphere and with stirring. After stirring the so-formed reaction mixture for 5 minutes at 0° the cooling bath was removed and the reaction mixture was then stirred at 20° for 72 hours. It was then evaporated to dryness in vacuo, the residue was taken up in benzene and evaporated in vacuo, and this treatment was repeated several times to remove the solvent. The so-obtained residue was then taken up in ether and filtered through a filter aid (Celite) to remove inorganic salts. The filtered ether solution was washed with 0.5N sodium bicarbonate and with a saturated sodium chloride solution, then dried with magnesium sulfate and evaporated in vacuo giving crude dl-1-(5,6,7,7a-tetrahydro-1β - hydroxy - 7aβ-methyl-5-oxoindane - 4 - yl) - 3-pentanone cyclic ethylene ketal.

Example 7

Potassium tert.-butoxide (241 mg.) was dissolved in 7 ml. of dimethylformamide and this solution was then added, in the course of approximately 2 hours, to a solution of 332 mg. of dl - 7,7a-dihydro-1β-hydroxy-7aβ-methyl - 5(6H) - indanone and 880 mg. of 2-(2-bromoethyl) - 2 - ethyl-1,3-dioxolane in 8 ml. of dimethylformamide. This addition was conducted with stirring at 20° and under a nitrogen atmosphere. After the addition was completed, the reaction mixture was left at 20° for 14 hours. It was then evaporated to dryness in vocuo. The residue was taken up in benzene and evaporated in vacuo and this treatment was repeated several times to remove the solvent. The so-obtained residue was then taken up in ether and filtered through a filter aid (Celite) to remove inorganic salts. The ether solution was washed with 0.5N sodium bicarbonate and with a saturated sodium chloride solution, then dried with magnesium sulfate and evaporated in vacuo, yielding crude dl - 1 - (5,6,7,7a-tetrahydro - 1β-hydroxy-7-aβ-methyl - 5 - oxoindane - 4 - yl)-3-pentanone cyclic ethylene ketal.

Example 8

Sodium hydride in ether (84 mg. containing 57% hydride) was dispersed in anhydrous ether under a nitrogen atmosphere. The ether and mineral oil were removed with a pipette and the sodium hydride was dispersed in 16 ml. of dimethylformamide. To this suspension there was immediately added at 15°, while stirring under a nitrogen atmosphere, 332 mg. of dl - 7,7a-dihydro-1β-hydroxy-7aβ-methyl-5-(6H) - indanone dissolved in 5 ml. of anhydrous dimethylformamide. With stirring and under a nitrogen atmosphere, 482 mg. of 2-(2-bromoethyl)-2-ethyl - 1,3-dioxolane in 2 ml. of dimethylformamide was then added to the reaction mixture within the course of 5 minutes. The so-obtained reaction mixture was then stirred for 45 minutes at 40° after which it was left at 20° for 16 hours. To the reaction mixture there was then added a suspension of sodium hydride in 20 ml. of anhydrous dimethylformamide obtained by suspending 42 mg. of 57% sodium hydride in mineral oil in anhydrous ether under a nitrogen atmosphere, removing the ether and mineral oil, and dispersing the sodium hydride in the dimethylformamide. Following the addition of this sodium hydride to the reaction mixture, there was then immediately added to the reaction mixture, while stirring at 0° under a nitrogen atmosphere and within the course of 5 minutes, a solution of 241 mg. of 2(2-bromoethyl)-2-ethyl - 1,3 - dioxolane in 1 ml. of dimethylformamide. The reaction mixture was then stirred for 45 minutes at 40° and then left standing for 16 hours at 20°. It was then evaporated to dryness in vacuo, the residue taken up in benzene and evaporated in vacuo, and the treatment was repeated several times to remove the solvent. The so-obtained residue was then taken up in ether and filtered through a filter aid (Celite) to remove inorganic salts. The ether solution was washed with 0.5N sodium bicarbonate and a saturated sodium chloride solution and dried with magnesium sulfate and evaporated in vacuo yielding dl - 1 - (5,6,7,7a-tetrahydro-1β-hydroxy-7aβ-methyl - 5 - oxoindane - 4 - yl)-3-pentanone cyclic ethylene ketal as an oil.

Example 9

By reaction of dl - 7,7a-dihydro-1β-hydoxy-7aβ-methyl-5(6H)-indanone with ethyl vinyl ether in the presence of a catalytic amount of hydrochloric acid there was obtained dl - 7,7a - dihydro - 1β-(α-ethoxyethoxy) - 7aβ-methyl - 5(6H) - indanone, an acetal. Sodium hydride in mineral oil (91 mg. containing 57% sodium hydride) was suspended in ether under a nitrogen atmosphere. The ether and mineral oil were removed with a pipette and the sodium hydride was dispersed in 5 ml. of anhydrous dimethylformamide. To this suspension there was immediately added at 15°, while stirring under a nitrogen atmosphere, 477 mg. of the above-mentioned acetal, i.e., dl-7,7a-dihydro - 1β-(α-ethoxyethoxy) - 7aβ-methyl - 5(6H) - indanone, dissolved in 5 ml. of anhydrous dimethylformamide. The so-obtained reaction mixture was stirred for 90 minutes at 15° and then, in one portion, 480 mg. of 2 - (2-bromoethyl)-2-ethyl-1,3 - dioxolane dissolved in 2 ml. of dimethylformamide was added to the reaction mixture at 20°. Then the reaction mixture was allowed to stand for 22 hours at 20° under a nitrogen atmosphere. It was then evaporated to dryness in vacuo, the residue was taken up in benzene and evaporated in vacuo, and this treatment was repeated several times to remove the solvent. The so-obtained residue was then taken up in ether and filtered through a filter aid (Celite) to remove inorganic salts. The ether solution was washed with 0.5N sodium bicarbonate and with a saturated sodium chloride solution then dried with magnesium sulfate and evaporated in vacuo yielding crude dl - 1 - [5,6,7,7a-tetrahydro - 1β-(α-ethoxyethoxy)-7aβ-methyl - 5 - oxoindane - 4 - yl] - 3 - pentaone cyclic ethylene ketal.

Example 10

Crude reaction product (155.4 mg.) prepared by the procedure of Example 5 was hydrogenated in 5 ml. of absolute ethyl alcohol at 23° and atmospheric pressure in the presence of 75 mg. of 10% Pd on carbon catalyst. Hydrogenation took 4 hours. The tetra-hydropyranyl protecting group was split off during hydrogenation and the crude hydrogenation product containing dl-1-(3α, 4α,5,6,7,7a-hexahydro - 1β - hydroxy - 7aβ-methyl - 5-oxoindane - 4 - yl) - 3 - pentaone cyclic ethylene ketal was obtained. A portion (605 mg.) of this crude product was dissolved in 0.1N sodium methoxide in methanol. The resulting solution was stirred under a nitrogen atmosphere at 20° for 15 minutes yielding, in solution, dl-1-(3aα,4β, 5,6,7,7a-hexahydro - 1β - hydroxy - 7aβ - methyl - 5 - oxoindane - 4 - yl)-3-pentaone cyclic ethylene ketal. This solution was then refluxed with aqueous 1N HCl under a nitrogen atmosphere for 5 hours, yielding crude dl-2,3, 3a,4,5,7,8,9,9aβ,9bα - decahydro - 3aβ,6 - dimethyl - 3β-hydroxy-7-oxo-1H-benz[e]indene.

Example 11

Crude reaction product (390 mg.) prepared by the procedure of Example 5 was hydrogenated in 10 ml. of absolute ethyl alcohol at 23° and atmospheric pressure in the presence of 130 mg. of 10% Pd on calcium carbonate catalyst. Hydrogenation took 5 hours and grave crude hydrogenation product containing dl-1-(3aα,4α,5,6,7,7a-hexahydro - 1β - hydroxy - 7aβ - methyl - 5 - oxoindane - 4-yl)-3-pentanone cyclic ethylene ketal. A portion (605 mg.) of this crude product was dissolved in 0.1N sodium methoxide in methanol. The resulting solution was stirred under a nitrogen atmosphere at 20° for 15 minutes yielding, in solution, di-1-(2aα,4β,5,6,7,7a - hexahydro-1β-hydroxy-7aβ-methyl-5-oxoindane-4-yl) - 3 - pentanone cyclic ethylene ketal. This solution was then refluxed with aqueous 1N HCl under a nitrogen atmosphere for 5 hours, yielding crude dl-2,3,3a,4,5,7,8,9,9aβ,9bα-decahydro-3aβ, 6-dimethyl-3β-hydroxy-7-oxo-1H-benz[e]indene.

Example 12

Crude reaction product (450 mg.) prepared by the procedure of Example 5 was hydrogenated in 12 ml. of absolute ethyl alcohol at 23° and atmospheric pressure in the presence of 450 mg. of 10% Pd on BaSO$_4$. The tetrahydropyranyl protecting group was partially split off during the hydrogenation and crude hydrogenation product containing dl-1-(3aα,4α,5,6,7,7a-hexahydro-1β-hydroxy-7aβ-methyl-5-oxoindane-4-yl)-3-pentanone cyclic ethylene ketal was obtained. A portion (605 mg.) of this crude product was dissolved in 0.1N sodium methoxide in methanol. The resulting solution was stirred under a nitrogen atmosphere at 20° for 15 minutes yielding, in solution, dl-1-(3aα,4β,5,6,7,7a - hexahydro - 1β - hydroxy - 7aβ - methyl-5-oxoindane-4-yl)3-pentanone cyclic ethylene ketal. This solution was then refluxed with aqueous 1N HCl under a nitrogen atmosphere for 5 hours yielding crude dl-2,3,3a,4-5,7,8,9,9aβ,9bα - decahydro - 3aβ,6 - dimethyl - 3β - hydroxy-7-oxo-1H-benz[e]indene.

Example 13

Crude reaction product (378 mg.) prepared by the procedure of Example 5 was hydrogenated in 38 ml. of absolute ethyl alcohol at 23° and atmospheric pressure in the presence of 65 mg. of 10% Pd on BaSO$_4$ catalyst. Hydrogenation time was 2 hours. The crude hydrogenation product containing dl-1-(3aα,4α,5,6,7,7a-hexahydro-1β-hydroxy-7aβ-methyl-5-oxoindane-4-yl)-3-pentanone cyclic ethylene ketal was obtained. A portion (605 mg.) of this crude product was dissolved in 0.1N sodium ethoxide in methanol. The resulting solution was stirred under a nitrogen atmosphere at 20° for 15 minutes yielding, in solution, dl - 1 - (3aα,4β,5,6,7,7a - hexahydro-1β-hydroxy-7aβ-methyl-5-oxoindane-4-yl)-3-pentanone cyclic ethylene ketal. This solution was then refluxed with aqueous 1N HCl under a nitrogen atmosphere for 5 hours, yielding crude dl-2,3,3a,4,5,7,8,9,9aβ,9bα-decahydro-3aβ,6-dimethyl-3β-hydroxy-7-oxo-1H-benz[e]indene.

Example 14

8 g. of dl-1-(5,6,7,7a-tetrahydro-1β-hydroxy-7aβ-methyl-5-oxoindane-4-yl)-3-pentanone cyclic ethylene ketal was dissolved in 100 ml. of absolute ethanol. The so-obtained solution was then added to 2.36 g. of 10% Pd on BaSO$_4$ dispersed in a small amount of ethanol. Sufficient absolute ethanol was then added to bring the total volume of the reaction mixture to 210 ml. The reaction mixture was then hydrogenated in a rocking autoclave under a pressure of 45 p.s.i.g. at room temperature (ca. 25–26°). After about 1 hour, hydrogen absorption ceased (ca. 78% of theory) and then a further quantity of catalyst (2.36 g. of 10% Pd on BaSO$_4$) was added to the reaction mixture and hydrogenation resumed. After about ½ hour hydrogen absorption ceased. The catalyst was then removed by filtration through a filter aid (Celite) and the filtrate was concentrated in vacuo at 35° to dryness yielding an oily crude hydrogenation product containing dl-1-(3aα,4α, 5,6,7,7a - hexahydro - 1β - hydroxy - 7aβ - methyl - 5-oxoindane-4-yl)-3-pentanone cyclic ethylene ketal. 8.15 g. of the so-obtained crude hydrogenation product was dissolved in 90.5 ml. of methanol, and 9.95 ml. of 1N sodium methoxide in methanol added thereto. The reaction mixture was then stirred for 15 minutes under a nitrogen atmosphere at room temperature, yielding, in solution, dl-1 - (3aα,4β,5,6,7,7a - hexahydro - 1β-hydroxy-7aβ-methyl-5-oxoindane-4-yl)-3-pentanone cyclic ethylene ketal. Then, to this solution, in one portion, 98 ml. of 2N HCl and 171 ml. of water was added. The resultant mixture was then heated at reflux for 5 hours. It was then neutralized with 50% aqueous sodium hydroxide (10 ml.) and extracted four times, each time with 200 ml. of ether. The combined ether extracts were washed twice with 150 ml. of sodium bisulfite, stirring for 15 minutes after each addition of sodium bisulfite, three times with 150 ml. of saturated brine then dried over anhydrous sodium sulfate and evaporated in vacuo yielding crude dl-2,3,3a,4,5,7,8, 9,9aβ,9bα - decahydro - 3aβ,6 - dimethyl - 3β - hydroxy-7-oxo-1H-benz[e]indene. The crude product was dissolved in 150 ml. of ether and washed with 50 ml. of sodium bisulfite, stirring for 15 minutes after each addition of bisulfite. The aqueous phase was separated and the treatment with ether and sodium bisulfite was twice repeated. The resultant ether solution was then washed three times, each time with 50 ml. of saturated brine, dried over sodium sulfate and evaporated in vacuo at 35°. The so-obtained residue was chromatographed on aluminum oxide using benzene as the eluant. The benzene was then evaporated off in vacuo at 55° and the so-obtained residue dried in a vacuo at 55° for 45 minutes. It was then crystallized from ether/petroleum ether yielding dl - 2,3,3a,4,5,7,8,9,9aβ,9bα - decahydro - 3aβ,6 - dimethyl-3β-hydroxy-7-oxo-1H-benz[e]indene, m.p. 125–129.5° (sintering at 122°).

Example 15

4 g. of dl-1-(5,6,7,7a-tetrahydro-1β-hydroxy-7aβ-methyl-5-oxoindane-4-yl)-3-pentanone cyclic ethylene ketal was dissolved in 100 ml. of absolute ethanol. The so-obtained solution was then added to 1 g. of 10% Pd on BaSO₄ dispersed in a small amount of absolute ethanol. Additional absolute ethanol was then added to the reaction mixture to bring the total volume to 210 ml. The reaction mixture was then hydrogenated at room temperature and 50 p.s.i.g. in a rocking autoclave. The hydrogenation took 3 hours, after which the catalyst was removed by filtration through a filter aid (Celite) and the filtrate concentrated in vacuo at 35–40° yielding a crude hydrogenation product containing dl-1-(3aα,4α,5,6,7,7a-hexahydro - 1β - hydroxy - 7aβ - methyl - 5 - oxoindane - 4-yl)-3-pentanone cyclic ethylene ketal which was equilibrated and cyclized as described herein to yield dl-2,3,3a, 4,5,7,8,9,9aβ,9bα - decahydro - 3aβ,6 - dimethyl - 3β-hydroxy-7-oxo-1H-benz[e]indene.

Example 16

A 53% sodium hydride in mineral oil suspension (0.181 g. of sodium hydride) was suspended in petroleum ether under a nitrogen atmosphere. The petroleum ether and mineral oil were then removed and the sodium hydride dispersed in 3 ml. of dimethylformamide. Under a nitrogen atmosphere and with stirring, there was then added 1.0 g. of 7,7a-dihydro - 1β - tetrahydropyranyloxy-7aβ-methyl-5(6H)-indanone dissolved in 6 ml. of dimethylformamide. The reaction mixture was then stirred for 30 minutes at 50–55°, and then, in the course of 110 minutes while the reaction mixture was maintained at 50–55°, 0.835 g. of 2-(2-bromoethyl) - 2 - ethyl - 1,3-dioxolane was slowly added thereto. The reaction mixture was then stirred for 4 hours at 50–55°. It was then mixed with 20 ml. of saturated aqueous ammonium chloride solution and then extracted five times, each time with 40 cc. of ether. The combined ether extracts were then twice washed with 40 ml. of saturated brine, then dried over sodium sulfate and evaporated in vacuo yielding dl-1-(5,6,7,7a-tetrahydro-1β-tetrahydropyranyloxy - 7aβ-methyl-5-oxoindane-4-yl) - 3 - pentanone cyclic ethylene ketal.

Example 17

A 53% sodium hydride in mineral oil suspension (0.181 g. of sodium hydride) was suspended in petroleum ether under a nitrogen atmosphere. The petroleum ether and mineral oil were then removed and the sodium hydride dispersed in 3 ml. of dimethylformamide. Under a nitrogen atmosphere, at 50° and with stirring, there was then added over the course of 5 minutes 1.0 g. of 7,7a-dihydro-1β-tetrahydropyranyloxy-7aβ-methyl - 5(6H) - indanone dissolved in 6 ml. of dimethylformamide. The so-obtained reaction mixture was then stirred for 10 minutes while being maintained at 50°. The reaction mixture was then heated to 95° and .9196 g. of 2-(2-bromoethyl)-2-ethyl-1,3-dioxolane in 6 ml. of dimethylformamide was added in the course of 5 minutes. Following the addition, the reaction mixture was stirred at 90–100° for ½ hour, then mixed with 20 ml. of saturated aqueous ammonium chloride and extracted five times, each time with 25 ml. of ether. The combined ether extracts were then washed twice, each time with 30 ml. of saturated brine, dried over anhydrous sodium sulfate and evaporated in vacuo at 35° yielding crude dl-1-(5,6,7,7a-tetrahydro-1β-tetrahydropyranyloxy-7aβ-methyl - 5 - oxoindane - 4 - yl) - 3-pentanone cyclic ethylene ketal.

Example 18

180 mg. of 53% sodium hydride in mineral oil was rinsed three times, each time with 5 ml. of petroleum ether, and blown dry with nitrogen. Then 8 ml. of dimethylsulfoxide was added thereto. The reaction mixture was then heated to 65–70° and stirred under a nitrogen atmosphere for 1 hour. It was then cooled to 20° and 1 g. of 7,7a-dihydro-1β-tetrahydropyranyloxy-7aβ-methyl - 5-(6H) - indanone in 8 ml. of dimethylsulfoxide added thereto in one portion. The so-obtained reaction mixture was then stirred under a nitrogen atmosphere for 2 hours at 20° after which the reaction mixture was heated to 80° and 960 mg. of 2-(2-bromoethyl)-2-ethyl-1,3-dioxolane in 4 ml. of dimethylsulfoxide added thereto in one portion. The resultant reaction mixture was then stirred at 80° for 195 minutes, cooled to room temperature and stirred under a nitrogen atmosphere overnight. The dimethylsulfoxide was then distilled off in vacuo at ca. 63°. The residue was mixed with 30 ml. of saturated aqueous ammonium chloride, then extracted four times, each time with 25 ml. of ether. The combined ether extracts were washed three times, each time with 30 ml. of saturated brine, dried over sodium sulfate and evaporated in vacuo yielding dl-1-(5,6,7,7a-tetrahydro-1β - tetrahydropyranyloxy-7aβ-methyl-5-oxoindane-4-yl) - 3 - pentanone cyclic ketal.

Example 19

4.63 g. of dl-1-(5,6,7,7a - tetrahydro - 1β - tetrahydropyranyloxy-7aβ-methyl-5-oxoindane-4-yl) - 3 - pentanone cyclic ethylene ketal in 35 ml. of absolute ethanol containing 1.2 g. of 10% Pd on BaSO₄ was hydrogenated in a rocking autoclave at 30–32° and 630 p.s.i.g. The hydrogenation took 260 minutes. The reaction mixture was then filtered and the filtrate evaporated in vacuo at 30° yielding a residual oil containing dl-1-(3aα,4α,5,6,7,7a-hexahydro-1β-hydroxy-7aβ-methyl-5-oxoindane - 4 - yl) - 3-pentanone cyclic ethylene ketal. The so-obtained oil was dissolved in 60 ml. of methanol and 6 ml. of 1N sodium methoxide in methanol added thereto. The so-obtained reaction mixture was stirred for 15 minutes under a nitrogen atmosphere at room temperature yielding, in solution, dl-1-(3aα,4β,5,6,7,7a-hexahydro-1β-hydroxy-7aβ - methyl-5-oxoindane-4yl)-3-pentanone cyclic ethylene ketal. To the so-obtained solution there was then added 100 ml. of water and 60 ml. of 2N HCl. The so-obtained reaction mixture was then refluxed under a nitrogen atmosphere for 2½ hours, cooled on an ice bath to 5° and neutralized to pH 7 with 50% sodium hydroxide. The neutralized reaction mixture was then extracted four times, each time with 120 ml. of ether. The combined ether extracts were washed with 120 ml. of 5% sodium bicarbonate, 120 ml. of saturated brine and twice with 30 ml. of saturated sodium bisulfite, stirring for 15 minutes after each addition of sodium bisulfite, and then finally twice with each time 120 ml. of saturated brine. The so-washed ether solution was then dried over sodium sulfate and evaporated in vacuo at 30° giving an oil which was dissolved in 75 ml. of ether. The so-obtained ether solution was then twice washed with 30 ml. of sodium bisulfite, stirring for 15 minutes after each addition of the sodium bisulfite. After this the solution was twice washed, each time with 50 ml. of brine, dried over sodium sulfate and evaporated in vacuo at 30° yielding dl-2,3,3a,4,5,7,8,9, 9aβ,9bα-decahydro-3aβ,6-dimethyl-3β - hydroxy - 7 - oxo-1H-benz[e]indene.

Example 20

4 g. of crude hydrogenation product prepared according to the procedure of Example 15 in 50 ml. of methanol was stirred at room temperature under a nitrogen atmosphere for 15 minutes with 5.25 ml. of methanolic 1N sodium methoxide. A 2 ml. portion of the so-obtained reaction mixture was placed in 5 ml. of water and neutralized (pH 7) with acetic acid. The neutralized mixture was then extracted three times, each time with 10 ml. of ether. The combined ether extracts were washed twice with 10 ml. of water, twice with 10 ml. of saturated brine, dried over sodium sulfate and evaporated in vacuo at 20° giving dl-1-(3aα,4β,5,6,7,7a-hexahydro-1β-hydroxy - 7aβ- methyl-5-oxoindane-4-yl) - 3 - pentanone cyclic ethylene ketal.

To the remainder of the reaction mixture resulting from the sodium methoxide treatment there were added 90 ml. of water and 52 ml. of 2N HCl. The resultant reaction mixture was then refluxed under a nitrogen atmosphere for 3½ hours at which point a 100 ml. portion was removed. The remainder of the reaction mixture was refluxed for a further 1½ hours (total reflux time for this portion was 5 hours).

The 100 ml. portion which had been removed after 3½ hours of refluxing was cooled on an ice bath to 5°, neutralized (pH 7) with 50% sodium hydroxide and the neutralized mixture extracted four times, each time with 50 ml. of ether. The combined ether extracts were then washed with 50 ml. of 5% sodium bicarbonate, 50 ml. of saturated brine and left standing at 5° for 60 hours.

The portion of the reaction mixture which had been refluxed for 5 hours was worked up in exactly the same manner as the portion which had been refluxed for 3½ hours, and the resultant ether solution was left standing at 5° for 60 hours. After being permitted to remain at 5° for 60 hours the ether solutions were then each washed four times, each time with 15 ml. of saturated sodium bisulfite, stirring for 15 minutes after each addition of sodium bisulfite. The so-obtained solutions were then further washed three times, each time with 50 ml. of saturated brine, dried over sodium sulfate and evaporated in vacuo at 30°, yielding, as an oil, dl-2,3,3a,4,5,7,8,9,9a$\beta$,9b$\alpha$-decahydro-3a$\beta$,6-dimethyl-3$\beta$-hydroxy - 7 - oxo-1H-benz[e]indene, which was crystallized from ether/petroleum ether.

Example 21

50.0 g. of dl-7,7a-dihydro-1$\beta$-hydroxy-7a$\beta$-methyl-5(6H)-indanone was dissolved in 1.25 liters of dichloromethane and the reaction mixture cooled in acetone/Dry Ice bath. 12.5 ml. of 47% boron trifluoride in ether was added to the reaction mixture, and then 5.25 ml. of 100% phosphoric acid. 1.88 liters of isobutylene was collected in an acetone/Dry Ice bath, the liquid was filtered through a glass wool plug and added to the reaction mixture. The flask containing the reaction mixture was then stoppered, and the mixture was stirred for 3 hours during which time the temperature in the reaction vessel slowly rose to room temperature. An additional 6.25 ml. of 47% boron trifluoride in ether and 2.6 ml. of 100% phosphoric acid was then added to the reaction mixture. Stirring was continued overnight, at room temperature, after which the reaction mixture was poured into 1.25 liters of 2M-ammonium hydroxide. The aqueous layer was then extracted three times, each time with 600 ml. of dichloromethane. The dichloromethane extracts were combined and washed three times, each time with 1 liter of water and then once with 1 liter of brine, dried over sodium sulfate and concentrated in vacuo (40°) yielding crude dl-7,7a-dihydro-1$\beta$-(t-butoxy)-7a$\beta$-methyl-5(6H)-indanone as a yellow oil. The crude product was crystallized by first treating a petroleum ether (150 ml.) solution thereof with charcoal (Norite) and cooling overnight at −20° yielding yellow crystals, m.p. 42–43.5°. The mother liquors were concentrated to ca. 75 ml. and charcoaled as above yielding further purified product, m.p. 42–43.5° (sintering 39°).

Example 22

Example 22A.—1.17 g. of sodium hydride in mineral oil (containing 53% sodium hydride) was washed with petroleum ether and dried under a nitrogen atmosphere. To this there was then added 40 ml. of dimethylsulfoxide and the mixture stirred at 65° under a nitrogen atmosphere for one hour. The mixture was then cooled to room temperature and to the cooled solution there was added, in the course of three minutes, 5.0 g. of dl-7,7a-dihydro-1$\beta$-(t-butoxy)-7a$\beta$-methyl-5(6H)-indanone in 40 ml. of dimethylsulfoxide. The mixture was then stirred at room temperature under a nitrogen atmosphere for 1½ hours.

Then 5.40 g. of 2-(2-bromoethyl)-2-ethyl-1,3-dioxolane in 20 ml. of dimethylsulfoxide was added thereto and stirring continued at room temperature for 4 hours. The reaction mixture was then partitioned between 100 ml. of saturated ammonium chloride and 100 ml. ether. The organic phase was washed with water, brine, dried over sodium sulfate and the solvent was then removed in vacuo (30°) giving a yellow oil product which was a mixture containing dl-1-[5,6,7,7a-tetrahydro-1$\beta$-(t - butoxy)-7a$\beta$-methyl - 5 - oxoindane-4-yl]-3-pentanone cyclic ethylene ketal which could be obtained in purified form by chromatography.

Example 22B.—To 1.17 g. of 53% sodium hydride in mineral oil treated as in Example 22A, there was added in the course of 2 minutes 5.0 g. of dl-7,7a-dihydro-1$\beta$-(t-butoxy)-7a$\beta$-methyl-5(6H)-indanone in 50 ml. of dimethylformamide. The reaction mixture was then stirred at room temperature under a nitrogen atmosphere for 1½ hours and then, in the course of 2 minutes, 5.4 g. of 2-(2-bromoethyl)-2-ethyl-1,3-dioxolane in 20 ml. of dimethylformamide was added thereto. The resultant mixture was then stirred for 4 hours at room temperature under a nitrogen atmosphere and worked up as in Example 22A yielding a yellow oil containing dl-1-[5,6,7,7a-tetrahydro-1$\beta$-(t - butoxy)-7a$\beta$-methyl-5-oxoindane-4-yl]-3-pentanone cyclic ethylene ketal.

A purified sample of dl-1-[5,6,7,7a-tetrahydro-1$\beta$-(t-butoxy)-7a$\beta$-methyl-5-oxoindane-4-yl]-3-pentanone cyclic ethylene ketal as a colorless oil was obtained by thick layer chromatography of the above-obtained yellow oils. U.V. $\lambda_{max}$ 250 m$\mu$.

Example 23

25.0 g. of the crude product, i.e., yellow oil, containing dl - 1 - [5,6,7,7a-tetrahydro-1$\beta$-(t-butoxy)-7a$\beta$-methyl-5-oxoindane-4-yl]-3-pentanone cyclic ethylene ketal and obtained in Examples 22A and/or 22B in 326 ml. of glacial acetic acid and 11 ml. of water was stirred and heated at 60° for 4 hours under a nitrogen atmosphere. The solution was cooled, basified to ca. pH 9 with 10% sodium hydroxide and extracted with ether. The ether phase was washed (water and brine), dried over sodium sulfate and the solvent removed in vacuo at 35° yielding crude dl-1-[5,6,7,7a-tetrahydro-1$\beta$-(t-butoxy)-7a$\beta$-methyl - 5 - oxoindane-4-yl]-3-pentanone that can be further purified by chromatography or molecular distillation. A sample was chromatographed on synthetic magnesia silica gel (Florisil), distilled for analysis and was obtained as a colorless oil. U.V. $\lambda_{max}$ 250 m$\mu$.

Example 24

92.29 g. of crude dl-1-[5,6,7,7a-tetrahydro-1$\beta$-(t-butoxy)-7a$\beta$-methyl-5-oxoindane-4-yl] - 3 - pentanone in a total volume of 2 liters of absolute ethanol was hydrogenated in the presence of 41.5 g. of 10% palladium/barium sulfate at room temperature and atmospheric pressure in the usual fashion. The reaction was stopped after 104% of the theoretical amount of hydrogen was consumed, the reaction mixture then filtered and equilibrated by adding 20 g. of sodium methoxide and stirring under a nitrogen atmosphere for 1 hour at room temperature. Cyclization was carried out by adding 950 ml. of ethanolic 3N-hydrochloric acid. The reaction mixture was then stirred and refluxed under a nitrogen atmosphere for 6 hours at room temperature. The resultant solution was cooled and adjusted to ca. pH 7 with about 900 ml. of 10% sodium hydroxide. The ethanol was removed in vacuo and the residue extracted three times, each time with 500 ml. of dichloromethane. The combined organic extracts were washed with water and brine, dried with sodium sulfate and the solvent removed in vacuo yielding a mixture containing dl-2,3,3a,4,5,7,8,9,9a$\beta$,9b$\alpha$ - decahydro - 3a$\beta$,6 - dimethyl-3$\beta$-hydroxy-7-oxo-benz[e]indene which was purified as follows. A 50 g. sample of the above crude was placed in benzene and filtered over a short column of neutral, activity III alumina to remove some colored impurities. This resultant material was triturated three times, each time with 50 ml. of hot petroleum ether. The oily residue was mixed with 25 ml. of hot petroleum ether and treated portionwise with a total of 33 ml. of warm ether. A tan solid precipitated. Another 25 ml. of petroleum ether was added, the mixture cooled 1 hour at −20°, and the supernatant decanted. To the solid residue, 45 ml. of ether and 50 ml. of petroleum ether were added and the mixture stored at −20°, overnight. The resultant solid was collected and washed with cold ether/petroleum ether (1:1) and dried in vacuo, 60°, 2 hours yielding purified dl - 2,3,3a,4,5,7,8,9,9aβ,9bα - decahydro - 3aβ,6 - dimethyl-3β-hydroxy-7-oxo-benz[e]indene, m.p. 96–117° (sintering at 91°).

Example 25

1.0 g. of dl-1-[5,6,7,7a-tetrahydro-1β-(t-butoxy)-7aβ-methyl-5-oxoindane-4-yl]-3-pentanone was hydrogenated and equilibrated as in Example 24 and cyclized with 3N ethanolic hydrochloric acid by refluxing the mixture for 15 minutes under a nitrogen atmosphere yielding a mixture containing mostly dl-2,3,3a,4,5,7,8,9,9aβ,9bα-decahydro-3aβ,6-dimethyl - 3β - (t-butoxy)-7-oxo-benz[e]indene. The mixture was dissolved in 3 ml. of trifluoroacetic acid and stirred for 1 hour at 0°. The product was treated to remove any trifluoroacetate formed [cf. Beyer / Heiszwolf, Rec. Trav. Chim., 84, 211 (1965)] and crystallized yielding dl - 2,3,3a,4,5,7,8,9,9aβ,9bα - decahydro-3aβ,6-dimethyl-3β-hydroxy-7-oxo-benz[e]indene, m.p. 119–127° (sintering 114°).

Removal of the t-butyl moiety was also carried out by refluxing the mixture containing dl-2,3,3a,4,5,7,8,9,9aβ, 9bα-decahydro - 3aβ,6 - dimethyl - 3β - (t-butoxy)-7-oxo-benz[e]indene in benzene containing p-toluene sulfonic acid, for several hours.

Example 26

0.117 g. of sodium hydride in mineral oil (containing 53% sodium hydride) was washed with petroleum ether and dried under a nitrogen atmosphere. To this there was then added 0.50 g. of dl-7,7a-dihydro-1β-(t-butoxy)-7aβ-methyl-5(6H)-indanone in 7 ml. of dimethylformamide. The reaction mixture was then stirred for 1½ hours under a nitrogen atmosphere at room temperature and then there was added 0.314 g. of 1-chloro-3-pentanone in 4 ml. of dimethylformamide. The resultant mixture was then stirred for 1 hour under a nitrogen atmosphere at ca. 25°, after which the mixture was poured into 10 ml. of saturated ammonium chloride solution, and this was extracted four times, each time with 10 ml. of ether. The combined organic extract was then washed twice, each time with 10 ml. of water and then once with 10 ml. of brine, dried over sodium sulfate and concentrated in vacuo at 40° yielding as a yellow oil a mixture containing dl-1-[5,6,7,7a-tetrahydro-1β-(t-butoxy)-7aβ-methyl - 5 - oxoindane-4-yl]-3-pentanone.

Example 27

4.43 g. of 2-(2-chloroethyl)-2-ethyl-1,3-dioxolane and 4.3 g. of sodium iodide in 50 ml. of acetone was refluxed on a steam bath for one hour. The precipitated sodium chloride (1.32 g.) was filtered off, and the filtrate concentrated in vacuo (20°), yielding 1-iodo-3-pentanone which was reacted with dl-7,7a-dihydro-1β-(t-butoxy)-7aβ-methyl-5(6H)-indanone as follows: To 1.41 g. of 53% sodium hydride in mineral oil, treated as in Example 22A, there was added a solution of 5.0 g. of dl-7,7a-dihydro-1β-(t-butoxy)-7aβ-methyl-5(6H)-indanone in 50 ml. of dimethylsulfoxide. The mixture was stirred at room temperature under a nitrogen atmosphere for one hour. A solution of the 1-iodo-3-pentanone product prepared above in 20 ml. of dimethylsulfoxide was then added to the reaction mixture in the course of 15 minutes, after which the reaction mixture was stirred at room temperature for four hours. The reaction mixture was then quenched with 200 ml. of saturated ammonium chloride solution and extracted three times, each time with 100 ml. of ether. The combined organic extract was washed three times, each time with 100 ml. of water, then three times, each time with 100 ml. of brine, dried over sodium sulfate and evaporated in vacuo at 30° yielding crude dl-1-[5,6,7,7a-tetrahydro-1β-(t-butoxy)-7aβ-methyl-5-oxoindane-4-yl]-3-pentanone.

Example 28

To 40 ml. of dry pyridine was added 19.96 g. of (±)-7,7a-dihydro - 1β - hydroxy-7aβ-methyl-5(6H)-indanone and 17.76 g. of sublimed phthalic anhydride. The suspension was stirred under a nitrogen atmosphere at 20° for 16 hours. The resulting solution was heated for one hour to 95–100° while stirring under a nitrogen atmosphere. The solution was then poured on ice-water, and acidified at 5° with 2N hydrochloric acid to pH 2.0. The resulting crystalline precipitate was filtered off, and dried, yielding crude racemic (±)-7,7a-dihydro-1β-hydroxy-7aβ-methyl-5(6H)-indanone hydrogen phthalate, which upon recrystallization from acetonitrile gave purified racemic (±)-7,7a-dihydro - 1β - hydroxy-7aβ-methyl-5(6H)-indanone hydrogen phthalate, m.p. 187–189°.

Example 29

Brucine (39.7 g.) was dissolved in 640 ml. of dry benzene. To remove the small amount of water present, 100 ml. of the benzene was distilled off. The solution was cooled to room temperature, and 28.0 g. of the racemic (±)-7,7a-dihydro-1β-hydroxy - 7aβ - methyl-5(6H)-indanone hydrogen phthalate was added in 100 ml. of hot benzene. Again, 100 ml. of benzene was distilled off, and the solution was then cooled to room temperature. Scratching induced crystallization. After standing at 20° for 16 hours, the crude brucine salt of the (+)-7,7a-dihydro-1β-hydroxy-7aβ-methyl-5(6H)-indanone hydrogen phthalate could be filtered off, m.p. 134.5–136° (d.), [α]$_D^{25}$ −1.70° (chloroform). The crude crystalline brucine salt of the (+)-7,7a-dihydro-1β-hydroxy-7aβ-methyl-5(6H)-indanone hydrogen phthalate was recrystallized from benzene giving the purified brucine salt, m.p. 136.5–137.5° (d.), [α]$_D^{25}$ −0.293° (chloroform).

The mother liquor of the crude brucine salt of the (+)-7,7a-dihydro-1β-hydroxy-7aβ-methyl-5(6H)-indanone hydrogen phthalate was evaporated to dryness under vacuum. The residual oil was treated several times with ether, and the ether evaporated under vacuum. The residue was then dissolved in hot acetone, and a small amount of ether was added. After standing for 16 hours at 20°, the crude brucine salt of the (−)-7,7a-dihydro-1β-hydroxy-7aβ-methyl - 5(6H) - indanone hydrogen phthalate was filtered off, m.p. 118–142° (d.), [α]$_D^{25}$ −31.9° (chloroform).

Example 30

To 28.83 g. of the brucine salt of the (+)-7,7a-dihydro-1β-hydroxy-7aβ-methyl - 5(6H) - indanone hydrogen phthalate in 300 ml. of acetone there was added while stirring at 20°, 360 ml. of 0.16N hydrochloric acid. The acetone was then evaporated under vacuum, and the resulting oil was extracted from the water with ethyl acetate and with ether. The combined extract was washed with 0.1N hydrochloric acid, then with sodium chloride solution, dried with sodium sulfate, filtered, and evaporated under vacuum giving crystalline (+)-7,7a-dihydro-1β-hydroxy - 7aβ - methyl - 5(6H) - indanone hydrogen phthalate which upon crystallization from benzene melted at 130–130.5°, [α]$_D^{25}$ +104.1° (chloroform).

Example 31

The (+)-7,7a-dihydro-1β-hydroxy-7aβ-methyl-5(6H)-indanone hydrogen phthalate (10.86 g.) was stirred under nitrogen in 19 ml. of 5.0N sodium hydroxide at 20° for 25 minutes. The reaction mixture was then cooled in an ice bath, and neutralized with 2N HCl. It was extracted with ethyl acetate and with ether, the combined extract was first washed with saturated sodium bicarbonate solution, then with sodium chloride solution. It was dried with sodium sulfate, filtered, and evaporated under vacuum to a solid, which was crystallized from ether-petroleum ether, giving crude (+)-(1S,7aS)-7,7a-dihydro-1-hydroxy-7a-methyl-5(6H)-indanone which upon recrystallization from di-isopropyl ether melted at 84.5–85°, $[\alpha]_D^{25}$ +90.4° (benzene).

Example 32

The dextrorotatory keto alcohol (+)-(1S,7aS)-7,7a-dihydro-1-hydroxy-7a-methyl-5(6H)-indanone (2.5 g.) was dissolved in 7 ml. of anhydrous tetrahydrofuran. Anhydrous dihydropyran (4.5 ml.) and 0.06 ml. of 85% phosphoric acid was added while stirring under a nitrogen atmosphere at 20°. The reaction mixture was then refluxed for 5 hours, then cooled to approximately 10°, and added within the course of 10 minutes to 25 ml. of a cooled and stirred saturated sodium bicarbonate solution. Ether and enough water were then added to cause the separation of the organic layer. The ether layer was separated and the water layer was extracted three more times with ether. The combined ether extract was washed with a sodium chloride solution, dried over sodium sulfate, filtered, and evaporated under vacuum. The residual oil was treated several times with toluene under vacuum giving an oil, the tetrahydropyranyl ether (+)-7,7a-dihydro-1β-tetrahydropyranyloxy-7aβ-methyl - 5(6H) - indanone. Ultraviolet absorption: $\lambda_{max}$ 238 m$\mu$ ($\epsilon$ 13,475).

Example 33

Sodium hydride in mineral oil (580 mg. containing 53% hydride) was suspended in anhydrous hexane under nitrogen. The hexane and mineral oil were removed, and the sodium hydride was dispersed in 30 ml. of anhydrous dimethyl sulfoxide. To this suspension was added, within the course of 10 minutes, 3.2 g. of the (+)-7,7a-dihydro-1β-tetrahydropyranyloxy-7aβ-methyl - 5(6H) - indanone dissolved in 20 ml. of dimethyl sulfoxide, while stirring at 18–20°. Gas evolution ceased after stirring for 1¾ hours, at which time 3.06 g. of 2-(2-bromoethyl)-2-ethyl-1,3-dioxolane in 20 ml. of dimethylsulfoxide was added to the reaction mixture within the course of 10 minutes and stirring under a nitrogen atmosphere at 20° was continued for 20 hours. The dimethylsulfoxide was then removed under high vacuum. The residue was taken up in water, and it was then extracted with ether. The extract was washed with a sodium chloride solution, dried over sodium sulfate, and evaporated under vacuum giving an oil which was chromatographed, using a neutral aluminum oxide column (430 g. of "Woelm," activity III) and benzene as the eluent, gave 2.364 g. of (+)-1-(5,6,7,7a-tetrahydro-1β-tetrahydropyranyloxy-7aβ-methyl - 5 - oxoindane-4-yl)-3-pentanone cyclic ethylene ketal as an oil. Ultraviolet absorption: $\lambda_{max}$ 248 m$\mu$ ($\epsilon$ 13,000). The fraction was 89.4% pure by vapor phase chromatography, $[\alpha]_D^{25}$ +19.2° (benzene). Two other fractions totaling 0.543 g. (80% pure by vapor phase chromatography) were combined with the main fraction and used in the next step of the synthesis.

Example 34

The 2.84 g. of chromatographed alkylation product obtained in Example 33 was hydrogenated in two equal portions in a Parr shaking hydrogenation apparatus at 3 atm. and 20°, using 150 ml. of absolute ethyl alcohol and 480 mg. of 10% Pd on BaSO$_4$ catalyst for each 1.42 g. portion of substrate. After 20 minutes the hydrogenation was stopped, the catalyst was filtered off, and 480 mg. of fresh catalyst was added. After an additional 10 minutes the hydrogenation was finished. The solution was then filtered through a pad of filter aid ("Celite"), and the filtrate was evaporated under vacuum giving a mixture containing the reduction products, 1 - (3aα,4α,5,6,7,7a-hexahydro-1β-tetrahydropyranyloxy-7aβ-methyl - 5 - oxoindane-4-yl)-3-pentanone cyclic ethylene ketal and 1-(3aβ,4β,5,6,7,7a-hexahydro-7aβ-methyl - 5 - oxoindane-4-yl)-3-pentanone cyclic ethylene ketal. The protecting group was lost, in part, during the hydrogenation.

The 2.2 g. mixture containing 1-(3aα,4α,5,6,7,7a-hexahydro-1β-tetrahydropyranyloxy - 7aβ - methyl - 5 - oxoindane-4-yl) - 3 - pentanone cyclic ethylene ketal and 1-(3aβ,4β,5,6,7,7a - hexahydro - 7aβ - methyl-5-oxoindane-4-yl) - 3 - pentanone cyclic ethylene ketal was then dissolved in 40 ml. of methanol containing 350 mg. of sodium methoxide. The mixture was stirred under nitrogen at 20° for 15 minutes. A solution of 37.0 ml. of 2N hydrochloric acid and 65 ml. of distilled water was then added at once. The so-formed mixture was then stirred and refluxed under a nitrogen atmosphere for 5 hours. It was then cooled to 5°, and neutralized with a 50% sodium hydroxide solution. The alcohol was evaporated under vacuum, and the water solution was extracted with ethyl acetate and with ether. The combined organic extract was washed with sodium chloride solution, dried over sodium sulfate, and evaporated under vacuum giving a somewhat oily solid which was broken up in a mixture of ether and petroleum ether (b.p. 30–60°), the solvent soluble fraction was removed, and the solid residue was recrystallized from ether giving (−)-2,3,3a,4,5,7,8,9,9aβ, 9bα - decahydro - 3aβ,6 - dimethyl - 3β - hydroxy-7-oxo-1H-benz[e]indene, m.p. 167–168.5°, $[\alpha]_D^{25}$ −38.4° (chlorofrom).

The mother liquor of the first crop was concentrated to a smaller volume, and it deposited on standing for 16 hours, a second crop of (−) - 2,3,3a,4,5,7,8,9,9aβ,9bα-decahydro-3aβ,6-dimethyl - 3β - hydroxy-7-oxo-1H-benz[e]indene m.p. 162–165°.

The remaining mother liquor was then evaporated to dryness under vacuum giving 760 mg. of an oil, which was purified by preparative thin layer chromatography using 1.0 mm. thick silica gel plates, and 1:1 benzene-ethyl acetate eluent. Crystallization from ether gave further (−) - 2,3,3a,4,5,7,8,9,9aβ,9bα - decahydro-3aβ,6-dimethyl-3β-hydroxy-7-oxo - 1H - benz[e]indene, m.p. 156–164°.

Example 35

45.5 mg. of sodium hydride in a 52 percent solution of mineral oil was washed with hexane by decantation and dispersed in 2 ml. of dimethylsulfoxide, Dl-7,7a-dihydro-1β-(t-butoxy) - 7aβ - ethyl-5(6H)-indanone was dissolved in 2 ml. of dimethylsulfoxide and added to the aforementioned suspension. The reaction mixture was agitated at 20° under a nitrogen atmosphere for 80 minutes. A solution of 225 mg. of 2-(2-bromoethyl) - 2 - methyl-1,3-dioxolane in 1.6 ml. of dimethyl sulfoxide was added and the entire reaction mixture was stirred under a nitrogen atmosphere for 16 hours at 20°. It was then poured onto ice, extracted with ethyl acetate, and the extract was washed with brine and dried. Evaporation of the solvent under vacuo gave dl-1-(5,6,7,7a-tetrahydro-1β-(t-butoxy)-7aβ-ethyl - 5 - oxoindane-4-yl) - 3 - pentanone cyclic ethylene ketal as an oil $\lambda_{max}$ 245 m$\mu$ ($\epsilon$ 9,660);

$$\nu_{max/cm.^{-1}}^{1660} \gamma(CHCl_3).$$

274 mg. of the unsaturated ketone was dissolved in 25 ml. of ethanol and hydrogenated over 83 mg. 10 percent palladium on barium sulfate until the uptake of hydrogen ceased. The catalyst was removed by filtration, washed with ethanol and evaporated in vacuo to give 3aα,4α(5,6,7,7a - hexahydro- 1β - hydroxy-7aβ-ethyl-5-oxoindane-4-yl) - 3 - pentanone cyclic ethylene ketal. $\nu_{max}$ 1710 cm.$^{-1}$ (CHCl$_3$).

This mixture of C/D-cis and C/D-trans reduction products was equilibrated in 5 ml. of 0.1 N-sodium methoxide at 20° for 15 minutes under nitrogen. The reaction mixture was then hydrolysed and ring closed by refluxing in 10 ml. of 1-N hydrochloric acid in methanol-water for 5 hours to give crude dl-2,3,3a,4,5,7,8,9,9aβ,9bα - decahydro-3aβ-ethyl-3β-hydroxy-7-oxo - 1H - benz[e]indene. $\lambda_{max}$ 235 mμ (ε 3,340). Purification by chromatography gave the pure sample of racemate product, m.p. 143–5°; $\lambda_{max}$ 239 mμ (ε 15,300); $\nu_{max}$ 3500, 1660 and 1620 cm.$^{-1}$ (KBr pellet).

Example 36

112 grams of 2-ethyl cyclohexane-1,3-dione, 84 grams of methyl vinyl ketone and 400 ml. methanolic potassium hydroxide were heated together under reflux for 2.5 hours. The solvent was evaporated under vacuum and a solution of pyrrolidine in benzene (6 percent v./v.; 200 ml.) was added. The mixture was heated to boiling and distilled at a rate of 150 ml./hr. while fresh pyrrolidine in benzene solution was added in order to keep the volume of the reaction constant. At the end of three hours, the distillate contained 17 ml. of water. The reaction was cooled, diluted with ethyl acetate, washed free of pyrrolidine with 3N hydrochloric acid, washed twice with brine, dried and evaporated. The residue was distilled at a temperature between 112°–117°, the distillate being a crystalline mass. Crystallization from ether gave dl-8a-ethyl-3,4,8,8a-tetrahydro-1,6-(2H,7H)-naphthalendione, m.p. 64°–67°. The analytical sample obtained by repeated crystallization from ether, had a m.p. of 68–69°; $\nu_{max}$ 1710, 1660, 1615, cm.$^{-1}$, $\lambda_{max}$ 245 mμ (ε 12,980).

Example 37a 71.5 g. of 4-chloro-2-butanone was dissolved in 250 ml. of ether and added to the slurry of 12 g. of lithium aluminum hydride at —40° over a 50 minute period. The reaction mixture was agitated for an additional one-half hour at —30° and then a saturated aqueous solution of sodium sulfate (115 ml.) was added. The solids were then filtered off and washed with ether. Subsequent removal of the ether in vacuo yielded 4-chloro-2-butanol.

Example 37b 238 g. of 4-chloro-2-butanol produced in the above example was dissolved in 500 ml. of methylene chloride which was then added to a mixture of 24 ml. of concentrated sulfuric acid in 500 ml. of methylene chloride. 1 liter of liquid isobutylene was then added and the mixture was allowed to stand at room temperature for 20 hours. The organic phase was washed with brine, aqueous sodium bicarbonate solution and dried over magnesium sulfate. Removal of the solvents in vacuo gave 4-chloro-2-tertiarybutoxy-butane.

Example 37c

Dl-2,3,3a,4,5,7,8,9,9aβ,9βα - decahydro - 3aβ - ethyl-3β-hydroxy-7-oxo-1H-benz[e]indene obtained in Example 35 was dissolved in 200 ml. of acetone and treated with 1.5 ml. of Jones chromic acid solution and stirred for 30 minutes at room temperature. The reaction mixture was diluted with brine and was isolated by extraction with ether. Removal of the solvent in vacuo gave dl-2,3,3a,4,5,7,8,9aβ,9bα-decahydro-3aβ-ethyl - 3 - oxo - 7 - oxo - 1H-benz[e]indene.

Example 37d

A 57% sodium hydride in mineral oil dispersion was washed free of oil with ether, and then suspended in 20 ml. dry dimethylformamide under a nitrogen atmosphere Dl - 2,3,3a,4,5,7,8,9,9aβ,9bα - decahydro-3aβ-ethyl-3 - oxo - 7 - oxo - 1H - benz[e]indene in 20 ml. dry dimethylformamide was added in one portion to the sodium hydride suspension, and the reaction mixture was then stirred at 100° under a nitrogen atmosphere for 1 hour. The resulting solution was cooled to 20°, and 4-chloro-2-tertiarybutoxy-butane in 1 ml. dry dimethylformamide in one portion, was added thereto with stirring. After standing at 20° for 16 hours under a nitrogen atmosphere, the solution was evaporated in vacuo. The last traces of dimethylformamide were removed in high vacuo at about 80° bath temperature. The residual oil was dissolved in ethyl acetate, the ethyl acetate solution was washed with water, dried with sodium sulfate, and evaporated in vacuo furnishing an oil, 10-[3-tertiarybutoxybutyl] - 13 - methyl - 19 - nor - desA-androst-9-ene-5, 17-dione.

Example 38

The diketone, 10 - [3 - tertiary-butoxy-butyl]-18-methyl - 19 - nor - desA-androst-9-ene-5,17-dione, produced in Example 37 was dissolved in 50 ml. of ethanol. 0.3 Ml. of triethylamine and 100 ml. of a 5 percent palladium-carbon catalyst was then added to this solution. The reaction mixture was then hydrogenated at room temperature and atmospheric pressure until hydrogen consumption ceased. The solids were filtered off and the solvents removed in vacuo to yield the saturated diketone, 10-[3-tertiarybutoxybutyl] - 18-methyl-19-nor-desA-androstan-5,17-dione, which showed only one spot on thin layer chromatography analysis.

Example 39

500 Mg. of the diketone, 10-[3-tertiary-butoxy-butyl]-18 - methyl - 19 - nor - desA-androstan-5,17-dione was dissolved in 25 ml. of benzene containing a trace of p-toluenesulfonic acid (25 mg.) and the reaction mixture was heated under reflux for two and one-half hours. The organic phase was washed free of acid and the solvent evaporated in vacuo. The crude residue was dissolved in 35 ml. acetone and treated with 15 ml. of 1 N aqueous sulfuric acid. After standing at room temperature for 35 minutes, the solution was diluted with brine, extracted with ether affording the waxy hemiketal, 6a,9a-trans-2-methyl - 6aβ - ethyl - 7 - oxo - perhydrocyclopenta-[5,6]-naphtho - [2,1-b]-pyran-11a-ol. Further purification by crystallization from hexane gave pure product, m.p. 114–116°.

Example 40

750 Mg. of the hemiketyl 6a,9a-trans-2-methyl-6aβ-ethyl - 7 - oxo-perhydrocyclopenta[5,6]naphtho-[2,1-b] pyran-11a-ol produced in Example 39 was dissolved in 30 ml. of acetone. 1.26 G. of a solution of chromium trioxide which was dissolved in 6.5 ml. of 6 normal sulfuric acid, was added to the acetone mixture over a period of 10 minutes at room temperature and then agitated for one hour. The reaction mixture was diluted with brine and after extraction with ether and removal of the solvent in vacuo, an oil was produced. The oil was purified by chromatography on silica gel (60 g.) and after elution with a benzene-ether mixture (1:1) afforded 10-[3-oxo-butyl]-18-methyl-19-nor-desA-androstan-5,17-dione.

Example 41

100 Mg. of 10 - [3 - oxo - butyl]-18-methyl-19-nor-desA-androstan-5,17-dione produced in Example 40 was dissolved in 5 ml. of toluene. 10 Mg. of p-toluenesulfonic acid was added to the toluene mixture and heated under reflux for 3 hours. The reaction mixture was then diluted with benzene, washed free of acid by means of aqueous sodium carbonate solution and dried in vacuo. The residue was purified by chromatography on silica gel (10 g.) and after crystallization from a hexane-ether mixture yielded 13β - ethyl - gon -4- ene-3,17-dione, m.p. 156–158°.

Example 42

500 Mg. of 13β-ethyl-gon-4-ene-3,17-dione produced in Example 41 was dissolved in 10 ml. of a benzene-ether solvent mixture (1:1) and added to a solution of 50 ml. of liquid ammonia containing 0.1 ml. of acetone and 0.5 g. of potassium acetylide. The reaction mixture was agitated at the ammonia boiling point for two hours and then the ammonia was evaporated at room temperature. The organic materials were extracted with ether and then the solvent was evaporated in vacuo. The residue was purified by chromatography over 50 g. of silica gel and on elution with a benzene-ethyl acetate mixture, afforded 13β-ethyl-17α-ethinyl, 17-hydroxy-gon-4-ene-3-one.

Example 43

46 Ml. of freshly powdered sodium hydroxide was dissolved in 75 ml. of tertiary butanol at 50° under an atmosphere of nitrogen. 3.64 G. of keto-alcohol dl-1,2,3,3a,4,5,5aβ - 6,8,9,9aβ,9bα - dodecahydro - 3aβ-ethyl-3β-hydroxy - 6β - methyl-7H-benz[e]inden-7-one was added to the above solution. A solution of methyl vinyl ketone (6.79 g. in 8.5 ml. benzene) was then added slowly over a period of 40 minutes to the reaction mixture. The reaction mixture was stirred for an additional 20 minutes. 0.65 Ml. of acetic acid was added, and the solvent was evaporated at 45° under vacuum. The residue was dissolved in ether and filtered through alumina (neutral, activity I, 25 g.) and was then eluted with ether (1000 ml.). The ether was evaporated and the residue was dissolved in 50 ml. of benzene and absorbed on (alumina, neutral, activity III; 350 g.). The alumina was eluted with benzene (1600 ml.), benzene-ether (18:1, 3,500 ml.) and benzene-ether (9:1, 5,000 ml.), 350 ml. fractions being collected. Fractions 8 through 16 afforded the keto alcohol starting material, m.p. 107–135°. Fractions 9 through 30 yielded a gum which on crystallization from acetone hexane gave dl-17β-hydroxy-18-methyl-9β,10α-androst-4-en-3-one. Further crystallization from acetone-hexane gave an analytical sample, m.p. 148°–150°. $\nu_{max}$ 3650, 1660, 1610 cm.$^{-1}$; $\lambda_{max}$ 241–242 mμ ($\epsilon$ 16,200); NMR 1.34 p.p.m. (10α-methyl).

Example 44

99 G. of dl - 17β - hydroxy - 18β-methyl-9β,10α-androst - 4a - 3 - one was dissolved in 28 ml. of acetone, cooled with ice and stirred while 8N chromium trioxide in 12N sulfuric acid was added rapidly until an orange color remained in the solution. The reaction was allowed to proceed for a two to three minutes when it was quenched by the addition of isopropanol. The solution was diluted with water, the precipitate isolated and washed with water. Crystallization from aqueous methanol yielded dl-18-methyl-9β,10α-androst-4-ene-3,17-dione, m.p. 208–216° which repeated crystallization from acetone was raised to a melting point of 215–217°. $\nu_{max}$ 1730, 1665, 1615 cm.$^{-1}$; $\lambda_{max}$ 240 mμ ($\epsilon$ 16,400).

Example 45

(a) The diketone dl-8a-ethyl-3,4,8,8a-tetrahydro-1,6-(2H,7H)-naphthalenedione (159 g.) in tetrahydrofuran (430 ml.) was stirred while a solution of lithium aluminum tritertiary butoxyhydride (314 g. in 1,350 ml. of tetrahydrofuran) was added, cooling being used to maintain the temperature at 20 to 25°. On completion of the addition 3N hydrochloric acid (525 ml.) was added to bring the solution to pH 7, the temperature still being maintained at 20 to 25°. The precipitated solids were removed by filtration and the filtrate was concentrated to small volume under vacuum. The residue was extracted with ethyl acetate, the extracts washed with brine, dried and evaporated to yield crystalline, dl-4aβ-ethyl-5β-hydroxy - 4,4a,5,6,7,8 - hexahydro - 2(3H)-naphthalenone; m.p. 89°–90°.

(b) The keto alcohol, dl-4aβ-ethyl-5β-hydroxy-4,4a,5,6,7,8-hexahydro-2(3H)-naphthalenone (84 g. in dichloromethane (840 ml.) was treated with boron trifluoride etherate (47% in ether; 42 ml.) and phosphoric acid (100%; 14 ml.). Liquified isobutylene (638 g.) was added over 20 min. to the stirred solution and the reaction was allowed to proceed for a further 1.5 hr. The excess isobutylene was evaporated under vacuum and the mixture neutralized with ammonia (14% in water). The dichloromethane was then evaporated under vacuum and the residue dissolved in ethyl acetate, washed with brine, dried and evaporated. The thus obtained medium brown crystalline solid (107 g. 98%) which contained 97% of 6 as assayed by VPC, was used for conversion to 7 without further purification. An analytical sample of dl-5β-tert.butoxy - 4aβ-ethyl - 4,4a,5,6,7,8 - hexahydro - 2(3H)-naphthalenone was obtained by crystallization from dimethylsulfoxide, then from hexane and finally from methanol; m.p. 83–85°.

Example 46

Sodium hydride (52% in mineral oil; 16.6 g.) was washed with hexane by decantation and covered with dimethylformamide (400 ml.). The mixture was stirred and a solution of 6 (85.5 g.) in dimethylformamide (400 ml.) added slowly with cooling to keep the reaction temperature at 20°. After agitation for 1 hr., 1-bromo-3,3-ethylenedioxypentane (74.2 g.) was added, and stirring was continued for a further 4 hr. Saturated ammonium chloride solution (1000 ml.) was then introduced while the reaction mixture was cooled at 35°. The mixture was then extracted with ethyl acetate (3 × 900 ml.) and the extracts were washed with brine, dried, evaporated and heated at 100°/0.05 mm. to give a dark gum (117 g.). This material was diluted with corn oil (23 g.) and distilled in a falling film molecular still. Six passes at 139°/10 to 60 microns yielded, dl-5β-tert.butoxy-4aβ-ethyl-1-(3',3' - ethylenedioxypentyl) - 4,4a,5,6,7,8 - hexahydro-2(3H)-naphthalenone. Analytically pure 7 was obtained as a clear gum by thin layer chromatography.

Example 47

(a) (55.9 g., 60% pure by VPC) of the product of Example 46 was hydrogenated in ethanol (450 ml.) over 10% palladium on barium sulphate (16 g.) until uptake of hydrogen ceased (approximately 1.2 molecular equivalents of hydrogen were consumed). The catalyst was removed by filtration and the filtrate concentrated to 250 ml.; 3N hydrochloric acid (60 ml.) was added and the solution was heated under reflux for 3 hr., then cooled and neutralized with 3N sodium hydroxide. The solvent was evaporated and the product isolated by extraction with ethyl acetate. The resultant dark gum (36 g.) was crystallized from ether to yield, dl-4,4aβ,4bα,5,6,7,8,8a,9,10-decahydro-8aβ-ethyl - 8 - hydroxy-1-methyl-3H-phenanthren-2-one; m.p. 120–135°. Recrystallization from acetonehexane and then aqueous isopropanol gave an analytical sample; m.p. 142–144°.

(b) The keto alcohol, dl - 4,4aβ,4bα,5,6,7,8,8a,9,10-decahydro-8aβ-ethyl-8-hydroxy - 1 - methyl-3H-phenanthren-2-one (12.2 g.) in pyridine (23 ml.) and acetic anhydride (23 ml.) was left for 18 hr. at ambient temperature. The solution was poured into water, the precipitate isolated and crystallized from acetone-hexane to give, dl-4,4aβ,4bα,5,6,7,8,8a,9,10-decahydro - 8aβ-ethyl-8-hydroxy-1-methyl-phenanthren-2(3H)-one acetate; m.p. 121–129°. The analytical sample, from aqueous methanol, had m.p. 127.5–129°.

Example 48

The product of example 47 (7.05 g.) was hydrogenated in ethanol (180 ml.) and 3N hydrochloric acid (25 ml.) over 5% rhodium on alumina (2.4 g.) until the uptake of hydrogen ceased (approximately 1.1 equivalents of hydrogen were consumed). The catalyst was removed by filtration, the solution was neutralized with 3 N sodium hydroxide and the solvent evaporated under reduced pressure. The residue was extracted with ethyl acetate and the extracts washed with brine, dried and evaporated to yield a gum (7.3 g.). This material in methanol (50 ml.) was treated with potassium hydroxide solution (13% in methanol-water 9:1; 12 ml.) under an atmosphere of nitrogen. After warming on the steam bath for 2 hr. the solution was neutralized with 3N hydrochloric acid, the solvent evaporated and the product, dl-3,4,4aβ,4bα,5,6,7,8,8a,9,10,10aβ - dodecahydro - 8aβ - ethyl-8-hydroxy-1β-methylphenanthren-2(1H)-one isolated by extraction with ethyl acetate. Crystallization from ether gave a sufficiently pure for further reactions, m.p. 98–102°. Repeated crys-

Example 49

Sodium hydroxide (98 mg.; finely powdered) was dissolved in tertiary butanol (184 ml.) at 50° under nitrogen. To the solution were added 9.85 g. of the keto alcohol produced in Example 48 followed over 45 min. by methyl vinyl ketone (1.94 g.) in benzene (20 ml.). The reaction mixture was stirred for an additional 30 min., acetic acid (1 ml.) was added and the solvent evaporated under vacuum. The residue in ether was filtered through alumina (neutral, activity I; 30 g.), eluting with ether (500 ml.). The residue (11.9 g.) after evaporation of the solvent was dissolved in benzene and adsorbed on alumina (neutral, activity III; 1200 g.). The alumina was eluted with benzene (16× 800 ml.), benzene-ether (19:1; 10× 800 ml.), and benzene-ether (9:1; 14× 800 ml.) fractions of volume 800 ml. being collected. Fractions 8 through 20 yielded recovered starting reactant. Fractions 26 through 40 contained crude, dl-17a$\beta$-hydroxy-18-methyl-9$\beta$,10$\alpha$-D-homoandrost-4-en-3-one. This later material was triturated with ether and afforded an insoluble portion; m.p. 114–212°. The ether solution on concentration gave crystals; m.p. 94–114°. Charcoal treatment and repeated crystallization from ether-hexane and acetone-hexane gave pure product; m.p. 136–138°.

Example 50

The compound prepared in Example 49 (1.83 g. of crude gum) in acetone (25 ml.) was cooled on ice and 8N chromium trioxide in 12N sulfuric acid (1.8 ml.) was added until an orange colour persisted in the solution. After a reaction time of 2 min. the mixture was poured into water, the precipitate isolated and washed with water. This material (1.62 g.) on crystallization from dichloromethane-acetone, gave the dione, dl-18-methyl-9$\beta$,10$\alpha$ - D - homoandrost-4-en-3,17a-dione; m.p. 200–217°. Further crystallization from acetone gave a same m.p. 213.5–218°.

Example 51

Methyl vinyl ketone (260 ml.), dry 2-ethylcyclopentane-1,3-dione (240 g.), and a solution of potassium hydroxide (1 g.) in methanol (800 ml.) were heated together under reflux for 7 hr. The methanol was evaporated under reduced pressure and to the residue was added p-toluensulfonic acid (16 g.) in benzene (690 ml.). The reaction solution was then heated under reflux using a Dean-Stark water separator, until no more water collected (the amount collected exceeded the calculated quantity). After cooling the solution was washed with saturated sodium bicarbonate solution until free of acid, then twice with brine. The solution was dried, the benzene evaporated under vacuum and the residue distilled at 128°/12 mm. The distillate (299 g.) crystallized and was recrystallized from acetone-hexane to yield, dl-7,7a-dihydro-7a-ethyl - 1,5(6H) - indanedione; m.p. 83–86.5°. Pure material, obtained by crystallization from ether had m.p. 86–88°.

Example 52

The finely powdered dione, dl-7,7a-dihydro-7a-ethyl-1,5(6H)-indanedione (211 g.) as a suspension in ethanol (1000 ml.) was agitated and cooled to —10°. A solution of sodium borohydride (13.2 g.) in ethanol (1200 ml.) was added over 30 min. while the temperature was maintained at —5 to —10°. The reaction mixture was stirred for 1 hr. while the temperature rose to 5°, at which time all the solids had dissolved. The solution was then cooled to —5 to —10° and 3N hydrochloric acid added until the solution was at pH 5 to 7. The ethanol was then evaporated under vacuum and the residue dissolved in ethyl acetate (500 ml.) which was washed twice with brine, dried and evaporated to yield, dl-7,7a-dihydro-7a$\beta$-ethyl-1$\beta$-hydroxy-5(6H)indanone, as an oil of 85–90% purity as determined by VPC.

Example 53

(a) The keto alcohol, dl-7,7a-dihydro-7a$\beta$-ethyl-1$\beta$-hydroxy-5(6H)-indanone (9.7 g.) in benzene (100 ml.) was heated under reflux using a Dean-Stark trap. When no more water separated p-toluene-sulfonic acid (70 mg.) was added to the hot solution followed by dihydropyran (6 ml.). The solution was then allowed to cool to room temperature, washed twice with saturated sodium bicarbonate solution, twice with brine, dried and evaporated. The residue in hexane (20 ml.) was filtered through grade I alumina (30 g.), eluting with hexane (300 ml.). Evaporation of the eluate gave dl-7,7a-dihydro-7a$\beta$-ethyl-1$\beta$-(tetrahydro-2-pyranyloxy)-5(6H)-indanone as an oil.

The ether, dl-7,7a-dihydro-7a$\beta$-ethyl-1$\beta$-(tetrahydro-2-pyranyloxy)-5(6H)-indanone on treatment with semicarbazide hydrochloride in pyridine afforded a semicarbazone; m.p. 177–180° after crystallization from ethanol.

(b) The keto alcohol, dl-7,7a-dihydro-7a$\beta$-ethyl-1$\beta$-hydroxy-5(6H)-indanone (214 g.) in dichloromethane (1900 ml.) was treated with borontrifluoride etherate (47% in ether; 97 ml.) and phosphoric acid (100%; 32 ml.). The solution was stirred and isobutylene (liquified by cooling; 375 g.) was added over one hour. The excess isobutylene was evaporated under vacuum and the reaction mixture brought to pH 7 by addition of ammonia (14% in water). The solvent was then evaporated under vacuum and the residue in ethyl acetate washed with saturated sodium bicarbonate solution and brine. The residue (277 g.) obtained after drying and evaporation of the solvent was diluted with corn oil and distilled at 44–80°/35–20 microns in a rotating disc molecular still to yield, dl-1$\beta$-tert.butoxy-7,7a-dihydro-7a$\beta$-ethyl-5(6H)-indanone as a crystalline mass. An analytical sample obtained by crystallization from hexane had m.p. 53–54°.

Example 54

(a) The ether, dl-7,7a-dihydro-7a$\beta$-ethyl-1$\beta$-(tetrahydro-2-pyranyloxy)-5(6H)-indanone (7.09 g.) in dimethylformamide (7 ml.) was added dropwise over 5 min. to a stirred suspension of sodium hydride (56% in mineral oil; 1.6 g.) in dimethylformamide (10 ml.) at —15° under nitrogen. The mixture was allowed to warm to 0° and stirred for 4 hr. 1-Bromo-3,3-ethylenedioxypentane (7.85 g.) was then added and the mixture stirred for 18 hr. at ambient temperature. Saturated ammonium chloride solution (30 ml.) was added while the mixture was cooled to maintain the temperature at 25°. The product was isolated by extraction with ether and the crude oil (12.8 g.) in hexane was adsorbed on Florisil (130 g.). The column was eluted with hexane (1500 ml.) and hexane-ether (4:1; 2500 ml.) fractions of volume 100 ml. being collected. Fractions 23 through 40 afforded dl-7,7a-dihydro - 7a$\beta$ - ethyl - 4 - (3',3'-ethylenedioxypentyl)-1$\beta$-(tetrahydro-2-pyranyloxy)-5(6H)-indanone, as an oil.

(b) Sodium hydride (52% in mineral oil; 19.3 g.) was washed with hexane by decantation and dissolved in dimethylsulfoxide (800 ml.) by warming at 70° in an atmosphere of nitrogen. To this solution at 20° was added the ether, dl-1$\beta$-tert.-butoxy - 7,7a - dihydro-7a$\beta$-ethyl-5(6H)-indanone (100 g.) in dimethylsulfoxide (200 ml.), the addition taking 30 min. 1-Bromo-3,3-ethylenedioxypentant (86.5 g.) was then introduced and the mixture was stirred for 4 hr. Saturated ammonium chloride solution was added to bring the mixture to pH 7 while cooling as necessary to maintain the temperature at 20°. The product was isolated by extraction with ethyl acetate, the extracts washed with brine and dried. Evaporation of the solvent under vacuum (finally at 100°/1 mm.) gave a dark oil which was chromatographed on Florisile (1.4 kg.) n hexane, fractions of volume 1,400 ml. being collected. Elution with hexane (14 l.), hexane-ether (4:1, 21 l.) and hexane ether 1:1; 14 l.) afforded dl-1β-tert-butoxy - 7,7a - dihydro-7aβ-ethyl-4(3',3'-ethylenedioxypentyl)-5(6H)-indanone in fractions 5 through 36. The material thus obtained was 80 to 85% pure as judged by VPC.

Example 55

(a) The unsaturated ketone dl-1β-tert.butoxy - 7,7a-dihydro - 7aβ-ethyl - 4 - (3',3'-ethylenedioxypentyl) - 5, 6(H)-indanone (76 g.) in ethanol (700 ml.) was hydrogenated over 100% palladium on barium sulphate (20 g.) until uptake of hydrogen ceased (approximately 1:1 molecular equivalents of hydrogen were consumed). The catalyst was removed by filtration, washed with ethanol, and a 25 ml. aliquot of the filtrate (volume 1000 ml.) was evaporated and weighed (1.6 g.). The aliquot was returned to the main solution, 3N hydrochloric acid (340 ml.) was added, and the mixture was heated under reflux for 2.5 hr. The cooled solution was adjusted to pH 7 with 3N sodium hydroxide and evaporated under vacuum. The residue was partitioned between water and ethyl acetate and the organic phase washed with brine, dried and evaporated. The residual brown gum was crystallized from a small volume of methanol to yield, dl-1,2,3,3a,4,5,8,9, 9aβ, 9bα-deca-hydro - 3aβ - ethyl-3β-hydroxy-6-methyl-7H-benz[e]inden-7-one; m.p. 148–158°. A second crop (7.5 g.) from ether had m.p. 150–158°. The analytical sample, obtained by crystallization from acetone-hexane had m.p. 151–153°. (Dl-1,2,3,3a,4,5,8,9,9aβ,9bα-Decahydro-3aβ - ethyl - 3β - hydroxy-6-methyl-7H - benz[e] inden-7-one appears to exhibit polymorphism. The initial samples melted at or below 153°, but in subsequent preparations crystals were present in the melt up to 158°. No difference between the various samples could be detected).

(b) A small quantity of dl-3β-tert.butoxy-1,2,3,3a,4,5, 8,9,9aβ,9bα - decahydro - 3aβ-ethyl-6-methyl-7H-benz[e]inden-7-one was isolated in the course of chromatography of a sample of crude, dl-1,2,3,3a,4,5,8,9,9aβ,9bα-decahydro-3aβ-ethyl-3β-hydroxy - 6 - methyl7H-benz[e]inden-7-one. Dl-3β - tert.Butoxy - 1,2,3,3a,4,5,8,9,9aβ,9bα-decahydro-3aβ-ethyl - 6 - methyl - 7H - benz[e]inden-7-one crystallized from hexane and had m.p. 120–121°.

(c) A solution of the alcohol, dl-1,2,3,3a4,5,8,9,9aβ, 9bα - decahydro - 3aβ - ethyl-3β-hydroxy-6-methyl-7H-benz[e]inden-7-one (794 mg.) in pyridine (4.5 ml.) was treated with benzoyl chloride (0.5 ml.) and let stand 18 hr. at room temperature. The mixture was added to ice water, the precipitate isolated and crystallized from acetone to yield dl-1,2,3,3a,4,5,8,9,9aβ,9bα - decahydro-3aβ-ethyl - 3β - hydroxy-6-methyl-7H - benz[e]inden-7-one benzoate; m.p. 171–172°.

(d) The alcohol, dl - 1,2,3,3a,4,5,8,9,9aβ,9bα - decahydro-3aβ-ethyl - 3β - hydroxy-6-methyl-7H-benz[e]inden-7-one (10 g.) was dissolved in pyridine (20 ml.) and acetic anhydride (10 ml.) and the solution left for 18 hr. at room temperature. The mixture was poured into water, the precipitate isolated and crystallized from aqueous methanol to yield dl-1,2,3,3a,4,5,8,9,9aβ,9bα-decahydro-3aβ-ethyl - 3β - hydroxy-6-methyl-7H-benze[e]inden-7-one acetate; m.p. 72–83°. A further crystallization from aqueous methanol and one from hexane gave an analytically pure sample, m.p. 83.5–85°.

Example 56

The acetate dl-1,2,3,3a,4,5,8,9,9aβ,9bα-decahydro-3aβ-ethyl-3β-hydroxy-6-methyl - 7H - benz[e]inden-7-one acetate (8.7 g.) in ethanol (250 ml.) and 3N hydrochloric acid (28 ml.) was hydrogenated over 5% rhodium on alumina (2.7 g.) until uptake of hydrogen ceased (approximately 1.1 molecular equivalents were consumed). The catalyst was removed by filtration, 3N sodium hydroxide was added to bring the solution to pH 7, and the solvent was evaporated under vacuum. The residue was partitioned between water and ethyl acetate, and the organic phases were washed with brine, dried and evaporated. The resultant gum (8.9 g.) was disolved in methanol (30 ml.), nitrogen was passed through the solution and potassium hydroxide solution (13% in methanol water 9:1; 15 ml. ) added. The mixture was kept 18 hr. at room temperature under nitrogen, brought to pH 7 with 3N hydrochloric acid, and the solvent evaporated. The product was isolated by extraction with ethyl acetate, 7.3 g. gum being obtained. Crystallization from ether yielded dl - 1,2,3,3a,4,5,5aβ,6,8,9,9aβ, 9bα-dodecahydro-3aβ-ethyl-3β-hydroxy - 6β - methyl-7H-benz[e]inden-7-one; m.p. 119–138°. A second crop (0.29 g.) from the same solvent had m.p. 105–114°. An analytical sample obtained by crystallization from aqueous methanol had m.p. 111–114°. (Dl-1,2,3,3a,4,5,5aβ,6,8,9,9aβ,9bα - Dodecahydro - 3aβ - ethyl-3β-hydroxy-6β-methyl-7H-benz[e]inden-7-one appears to exhibit polymorphism with one modification having the melting point of the analytical sample and another melting ca. 140°. Melting points for different samples of this compound varied between 107 and 140° and sometimes changed drastically on recrystallization. Various samples were examined but no inhomogeneity could be detected).

We claim:

1. A compound selected from the group consisting of a compound of the formula

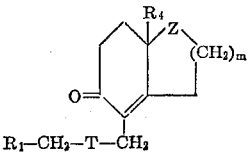

wherein $R_1$ is hydrogen or lower alkyl; Z is carbonyl or $CH(OR_2)$; $R_2$ is hydrogen, lower alkyl, lower alkoxy-lower alkyl, phenyl-lower alkyl, tetrahydropyranyl, lower alkanoyl, benzoyl, nitrobenzoyl, carboxy-lower alkanoyl, carboxybenzoyl, trifluoroacetyl or camphorsulfonyl; T is —C(X')=CH—, —C(OR_3)=CH— or —Q—CH_2—; $R_3$ is lower alkyl; X' is bromine, chlorine or iodine; $R_4$ is primary lower alkyl; m is an integer having a value of 1 or 2; and Q is carbonyl, lower alkylenedioxy - methylene, tetrahydropyranyloxy-methylene or phenyl-lower alkoxy-methylene; wherein lower alkyl, lower alkanoyl, lower alkoxy and lower alkylenedioxy wherein the term "lower" as used above means groups having from 1 to 5 carbon atoms;
its optical antipode and the racemate thereof.

2. A compound as in claim 1 which is 1-(5,6,7,7a-tetrahydro-1β - hydroxy - 7aβ - methyl-5-oxoindane-4-yl)-3-pentanone cyclic ethylene ketal.

3. A compound as in claim 1 which is 1-[5,6,7,7a-tetrahydro - 1β - (1-tetrahydropyranyloxy)-7aβ-methyl-5-oxoindane-4-yl]-3-pentanone cyclic ethylene ketal.

4. A compound as in claim 1 which is 1-[5,6,7,7a-tetrahydro-1β-(α - ethoxyethoxy)-7aβ-methyl - 5 - oxoindane-4-yl]-3-pentanone cyclic ethylene ketal.

5. A compound selected from the group consisting of a compound of the formula

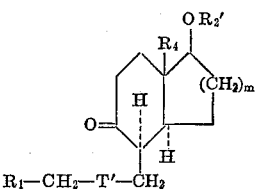

wherein $R_1$ is hydrogen or lower alkyl; $R_2'$ is hydrogen, lower alkyl, lower alkanoyl, benzoyl, nitrobenzoyl, carboxy-lower alkanoyl, carboxy-benzoyl, trifluoroacetyl or camphorsulfonyl; $R_4$ is primary lower alkyl; m is an integer having a value of 1 or 2; and T' is —C(X')=CH—, —C(OR_3)=CH— or —Q'—CH_2—; $R_3$ is lower alkyl; X' is bromine, chlorine or iodine;

and Q' is carbonyl, lower alkylene dioxymethylene; di-(lower alkoxy) - methylene or hydroxymethylene; wherein lower alkyl, lower alkanoyl, lower alkoxy and lower alkylenedioxy wherein the term "lower" as used above means groups having from 1 to 5 carbon atoms; its optical antipode and the racemate thereof.

6. A compound as in claim 5 which is 1-(3aα,4α,5,6,7,7a - hexahydro - 1β - hydroxy - 7αβ - methyl - 5 - oxoindane-4-yl)-3-pentanone cyclic ethylene ketal.

7. A compound as in claim 5 which is 1-[3aα,4a,5,6,7,7a - hexahydro - 1β - (1 - tetrahydropyranyloxy) - 7aβ-methyl-5-oxoindane-4-yl] - 3 - pentanone cyclic ethylene ketal.

8. A compound as in claim 5 which is 1-[3aα,4α,5,6,7,7a-hexahydro - 1β - (lower alkoxy-lower alkoxy) - 7aβ-methyl-5-oxoindane-4-yl] - 3 - pentanone cyclic ethylene ketal.

9. A compound selected from the group consisting of a compound of the formula

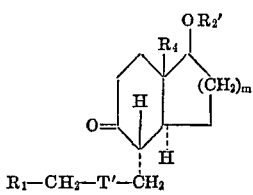

wherein R₁ is hydrogen or lower alkyl; R₂' is hydrogen, lower alkyl, lower alkanoyl, benzoyl, nitrobenzoyl, carboxy-lower alkanoyl, carboxy-benzoyl, trifluoroacetyl or camphorsulfonyl; R₄ is primary lower alkyl; m is an integer having a value of 1 or 2; and T' is —C(X')=CH—, —C(OR₃)=CH— or —Q'—CH₂—; R₃ is lower alkyl; X' is bromine, chlorine or iodine; and Q' is carbonyl, lower alkylene dioxy-methylene, di-(lower alkoxy) - methylene or hydroxy-methylene; wherein lower alkyl, lower alkanoyl, lower alkoxy and lower alkylenedioxy wherein the term "lower" as used above means groups having from 1 to 5 carbon atoms; its optical antipode and the racemate thereof.

10. A compound as in claim 9 which is 1-(3aα,4β,5,6,7,7a - hexahydro - 1β - hydroxy - 7aβ - methyl - 5 - oxoindane-4-yl)-3-pentanone cyclic ethylene ketal.

11. A compound as in claim 9 which is 1-[3aα,4β,5,6,7,7a - hexahydro - 1β - (1 - tetrahydropyranyloxy) - 7aβ-methyl-5-oxoindane-4-yl] - 3 - pentanone cyclic ethylene ketal.

12. A compound as in claim 9 which is 1-[3aα,4β,5,6,7,7a - hexahydro - 1β - (lower alkoxy-lower alkoxy) - 7aβ-methyl-5-oxoindane-4-yl] - 3 - pentanone cyclic ethylene ketal.

13. A compound as in claim 9 wherein R₄ is methyl.
14. A compound as in claim 9 wherein R₄ is ethyl.
15. A compound as in claim 9 wherein R₄ is propyl.
16. A compound as in claim 11 which is 3aα,4α(5,6,7,7a - hexahydro - 1β - hydroxy - 7aβ - ethyl - 5 - oxoindane-4-yl)-3-pentanone cyclic ethylene ketal.

17. A compound as in claim 1 which is dl-5β-tert. butoxy - 4aβ - ethyl - 1 - (3',3' - ethylenedioxypentyl)-4,4a,5,6,7,8-hexahydro-2(3H)-naphthalenone.

18. A compound as in claim 1 which is dl-7,7a-dihydro-7aβ - ethyl - 4 - (3',3' - ethylenedioxypentyl) - 1β - (tetrahydro-2-pyranyloxy)-5(6H)-indanone.

References Cited
UNITED STATES PATENTS
3,446,849  5/1969  Los _____ 260—586
3,692,803  9/1972  Hajos _____ 260—340.9

DONALD G. DAUS, Primary Examiner
J. H. TURNIPSEED, Assistant Examiner

U.S. Cl. X.R.
260—340.7, 456, 471, 476, 488B, 586H